(12) United States Patent
Bremmon

(10) Patent No.: US 12,262,141 B2
(45) Date of Patent: *Mar. 25, 2025

(54) SCREEN MOUNTING SYSTEM

(71) Applicant: Legrand AV Inc., Eden Prairie, MN (US)

(72) Inventor: Jeff Bremmon, Eden Prairie, MN (US)

(73) Assignee: LEGRAND AV INC., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/401,890

(22) Filed: Jan. 2, 2024

(65) Prior Publication Data

US 2024/0333868 A1 Oct. 3, 2024

Related U.S. Application Data

(63) Continuation of application No. 16/772,924, filed as application No. PCT/US2018/066094 on Dec. 17, 2018, now Pat. No. 11,882,379.

(60) Provisional application No. 62/599,660, filed on Dec. 15, 2017.

(51) Int. Cl.
*H04N 5/655* (2006.01)
*A47B 97/00* (2006.01)
*F16M 13/02* (2006.01)

(52) U.S. Cl.
CPC ........... *H04N 5/655* (2013.01); *A47B 97/001* (2013.01); *F16M 13/022* (2013.01)

(58) Field of Classification Search
CPC ............... A47B 81/061; A47B 81/062; A47B 97/001; Y10S 248/917; Y10S 248/919; Y10S 248/92; F16M 11/10; F16M 11/24; F16M 11/2092; F16M 11/041; F16M 13/02; F16M 13/022; F16M 2200/061; H04N 5/655

See application file for complete search history.

(56) References Cited

U.S. PATENT DOCUMENTS

| | | | |
|---|---|---|---|
| 6,102,348 A | 8/2000 | O'Neill | |
| 6,484,987 B2 | 11/2002 | Weaver | |
| 6,604,722 B1 | 8/2003 | Tan | |
| 6,886,701 B2 | 5/2005 | Hong et al. | |

(Continued)

FOREIGN PATENT DOCUMENTS

| | | |
|---|---|---|
| KR | 101083991 B1 | 11/2011 |
| KR | 101608309 B1 | 1/2017 |

(Continued)

OTHER PUBLICATIONS

Extended European Search Report for EP Application No. 18888502.4, mailed Jul. 27, 2021 (8 pgs).

(Continued)

*Primary Examiner* — Patrick D Hawn
(74) *Attorney, Agent, or Firm* — Bradley J. Thorson; DeWitt LLP

(57) ABSTRACT

A modular mounting system for attaching multiple electronic display devices to a wall in an array. The system provides for vertical attachment of multiple electronic displays to a single module, and for vertical and horizontal attachment of multiple modules. The disclosed modular system enables multiple displays to be mounted in a virtually unlimited number of shapes as well as the standard square and rectangular arrays.

18 Claims, 27 Drawing Sheets

(56) References Cited

U.S. PATENT DOCUMENTS

| | | |
|---|---|---|
| 7,097,143 B2 | 8/2006 | Kim et al. |
| D530,595 S | 10/2006 | Lam et al. |
| D560,672 S | 1/2008 | Muday et al. |
| 7,345,870 B2 | 3/2008 | Shin |
| 7,537,189 B2 | 5/2009 | Jung et al. |
| 7,611,109 B2 | 11/2009 | Lin |
| 7,712,717 B2 | 5/2010 | Burns |
| 7,823,847 B2 | 11/2010 | Bremmon et al. |
| 7,878,473 B1 | 2/2011 | Oh |
| 7,963,489 B2 | 6/2011 | O'Keene et al. |
| 7,984,888 B2 | 7/2011 | Park |
| 8,456,808 B2 | 6/2013 | Grey et al. |
| 8,891,249 B2 | 11/2014 | Stanek et al. |
| 8,910,804 B2 | 12/2014 | Kim et al. |
| 10,104,963 B2 | 10/2018 | Brandt et al. |
| 11,023,195 B2 | 6/2021 | Kwon et al. |
| 11,602,217 B2 * | 3/2023 | Brandt ................ A47B 81/064 |
| 2004/0211870 A1 | 10/2004 | Bremmon et al. |
| 2005/0087661 A1 | 4/2005 | Rabenius |
| 2006/0065800 A1 | 3/2006 | Bremmon |
| 2006/0291152 A1 | 12/2006 | Bremmon |
| 2008/0156949 A1 | 7/2008 | Sculler et al. |
| 2013/0048812 A1 | 2/2013 | Lozano |
| 2013/0334380 A1 | 12/2013 | Stifal et al. |
| 2016/0120309 A1 | 5/2016 | Brandt et al. |

FOREIGN PATENT DOCUMENTS

| | | |
|---|---|---|
| KR | 101695929 B1 | 1/2017 |
| WO | 2017044622 A1 | 3/2017 |

OTHER PUBLICATIONS

International Search Report and Written Opinion for PCT Application No. PCT/US2018/066094, mailed Apr. 29, 2019 (16 pgs).

* cited by examiner

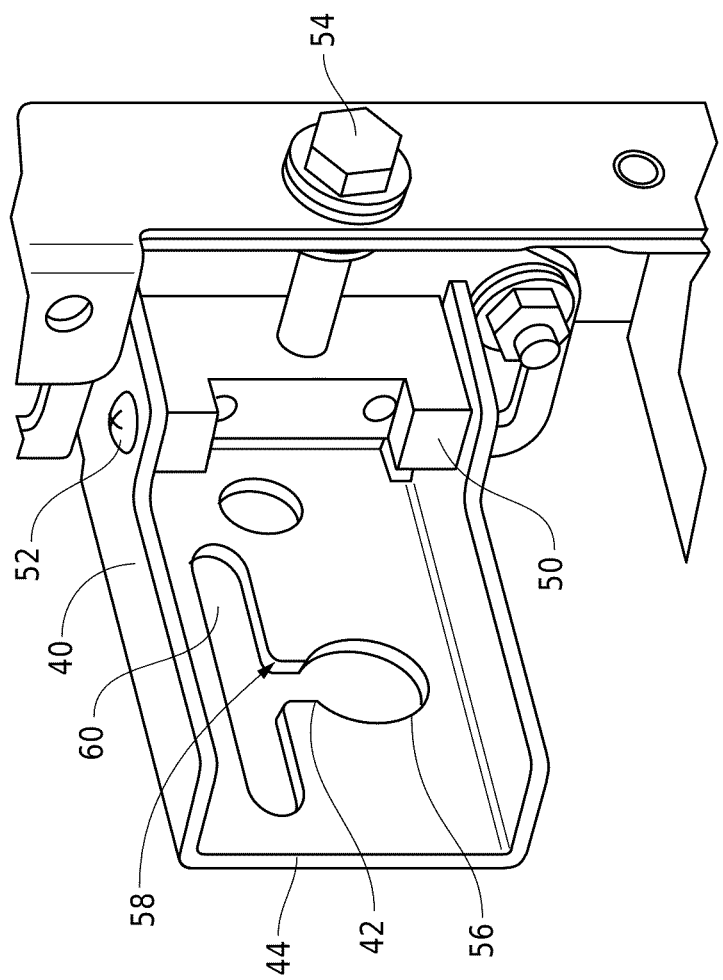

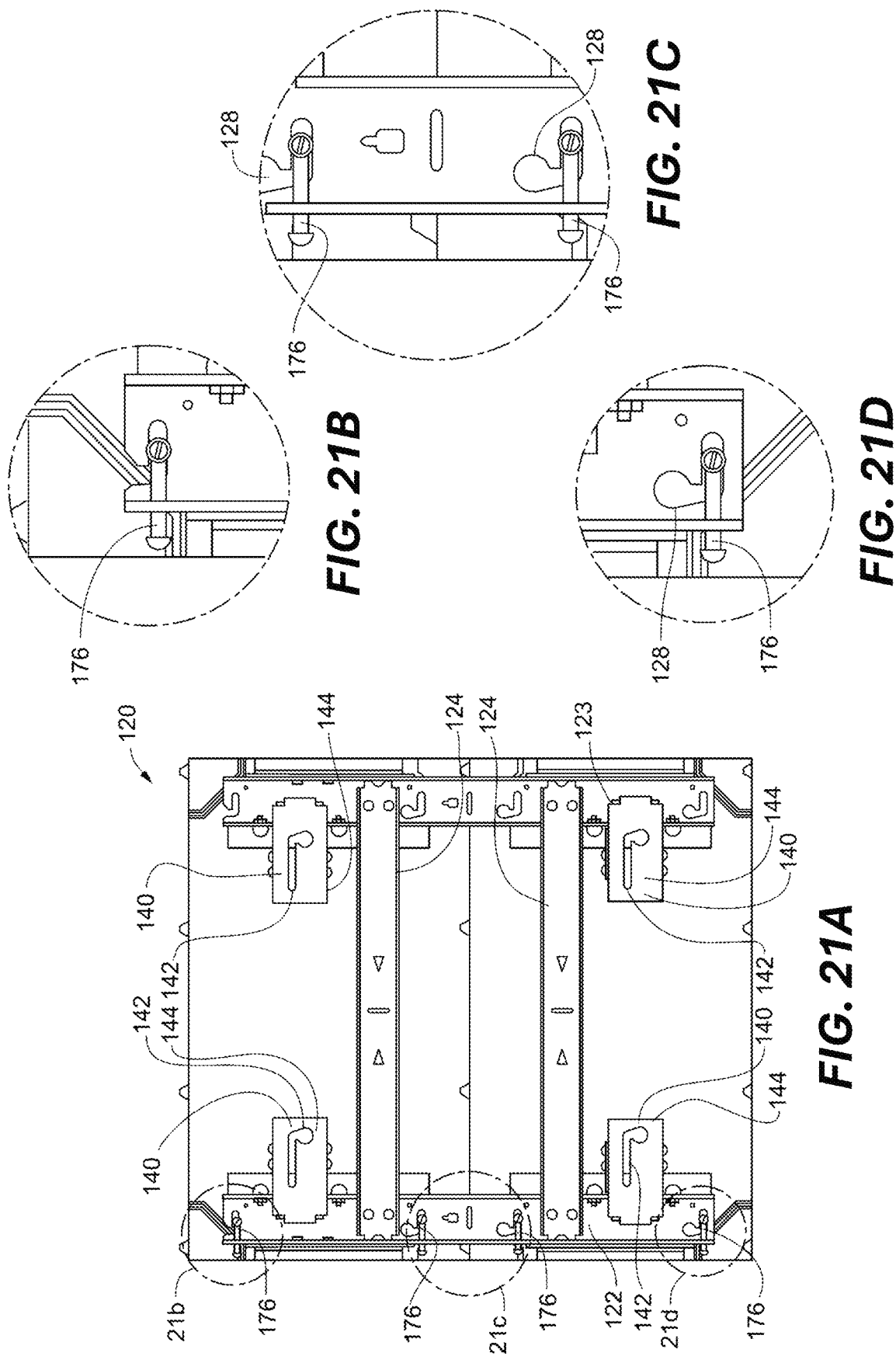

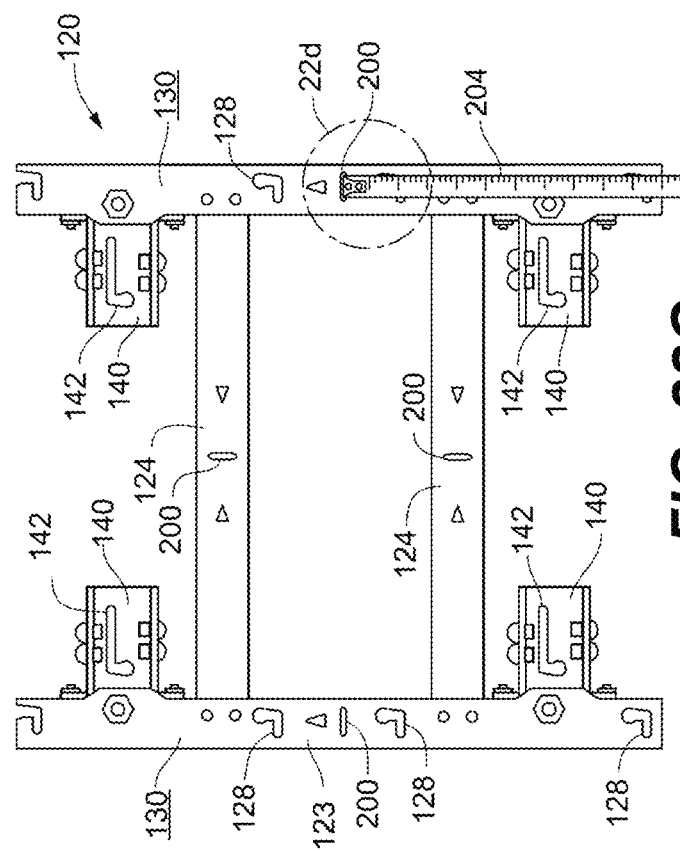
FIG. 22D
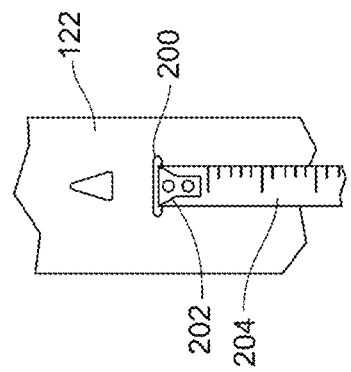
FIG. 22B
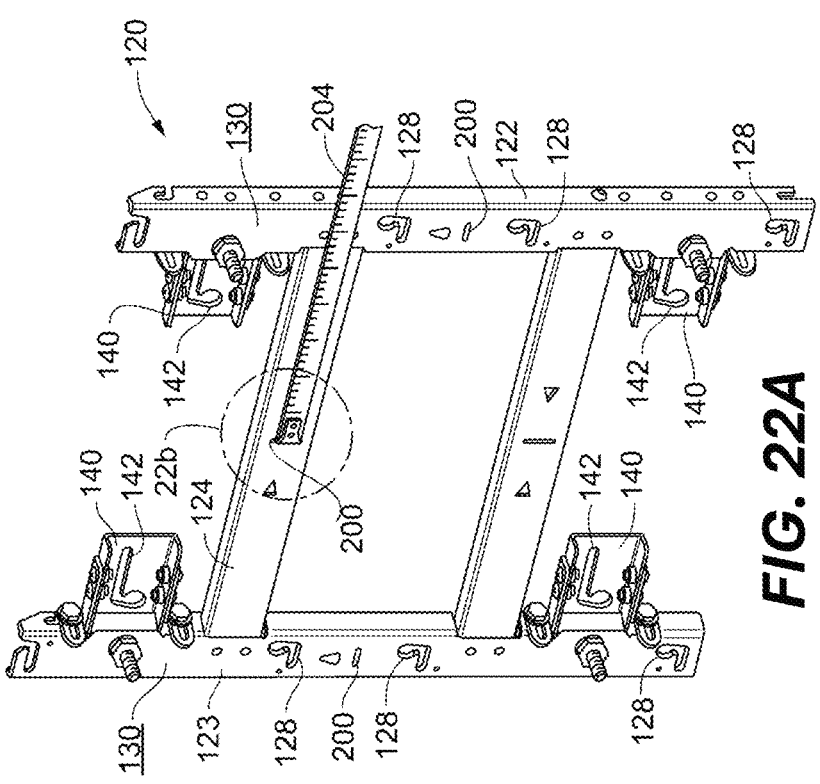
FIG. 22C
FIG. 22A

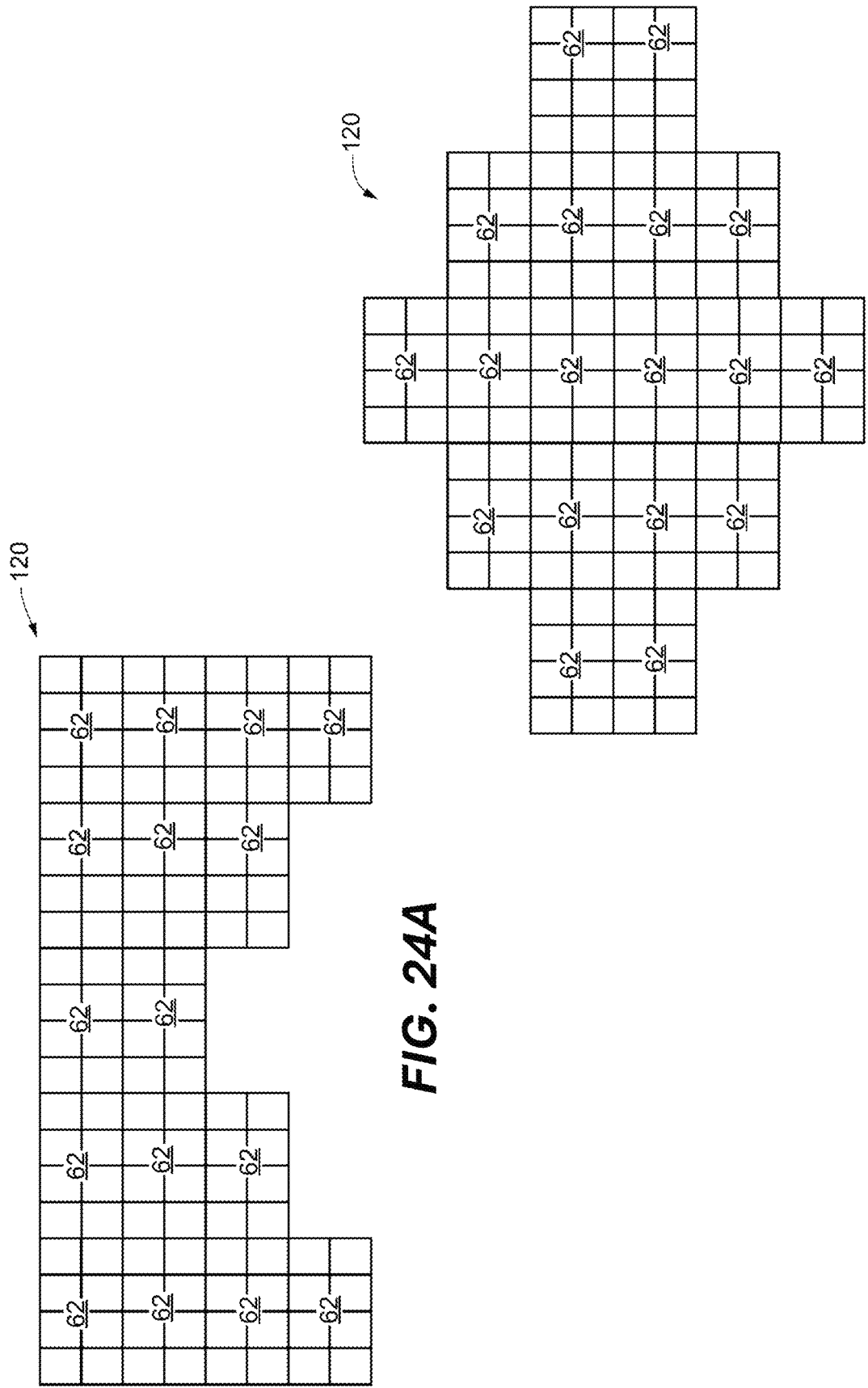

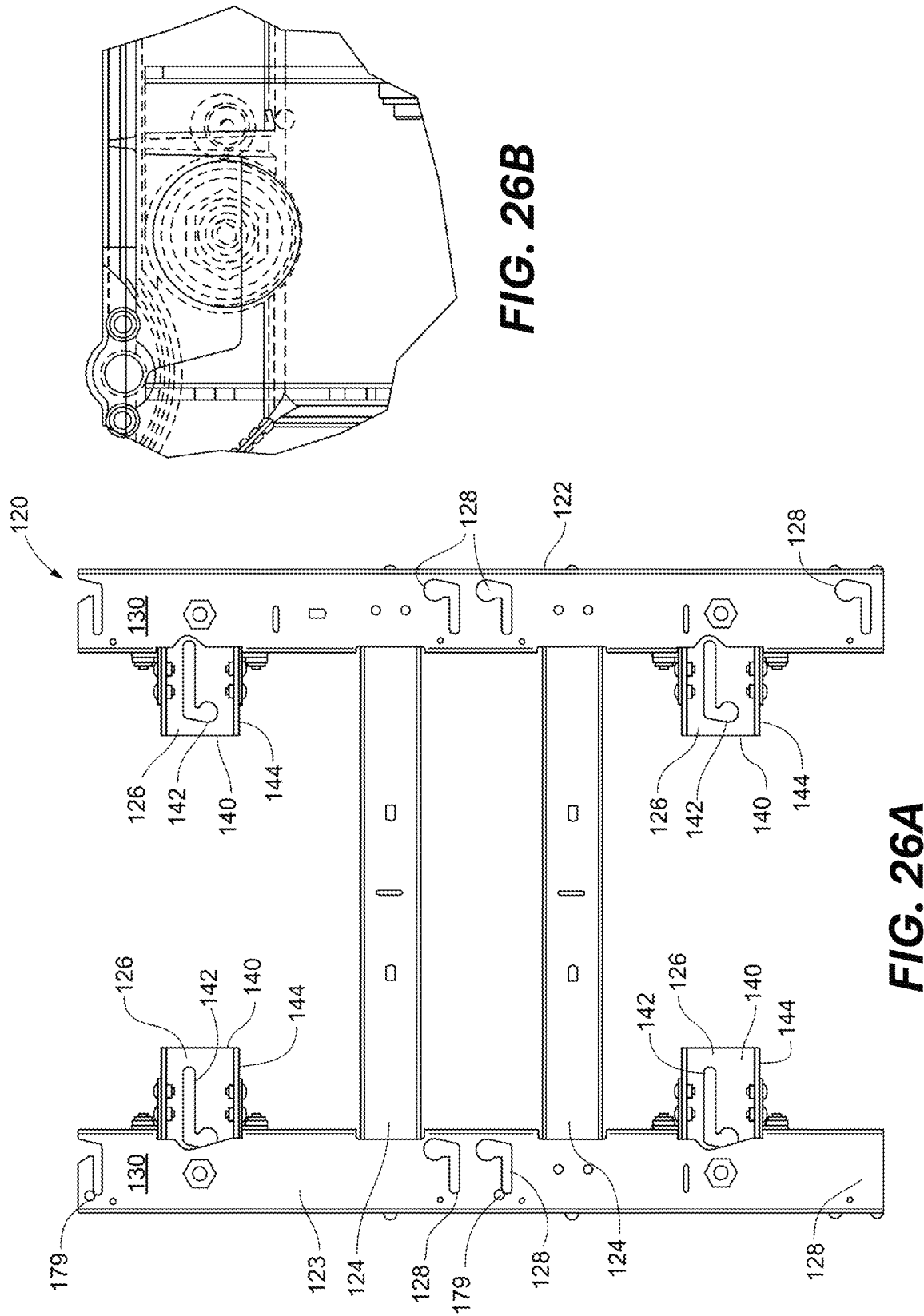

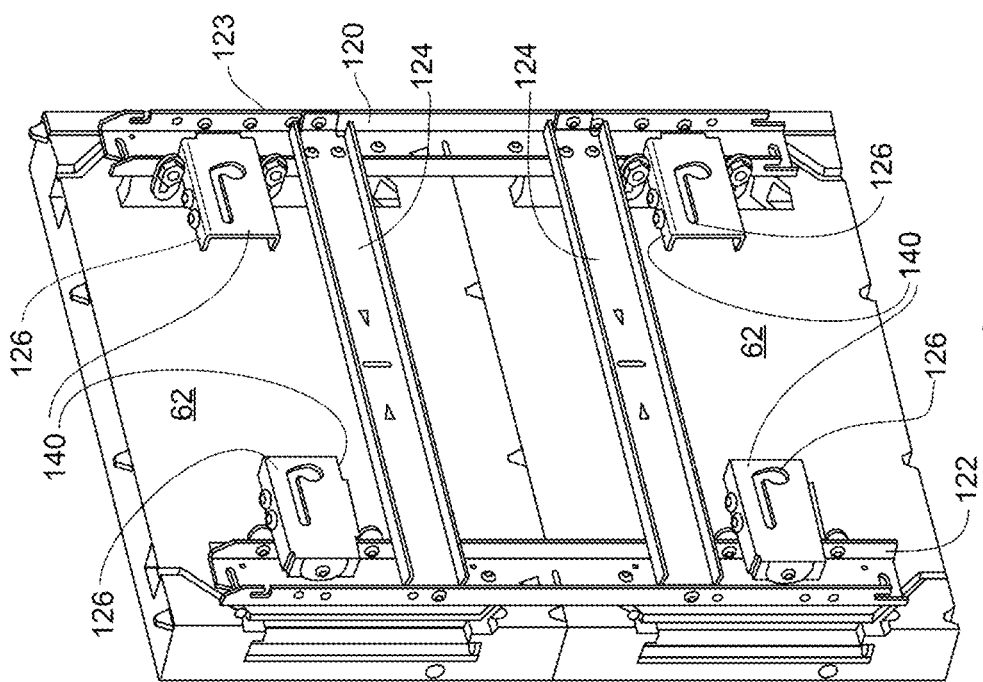
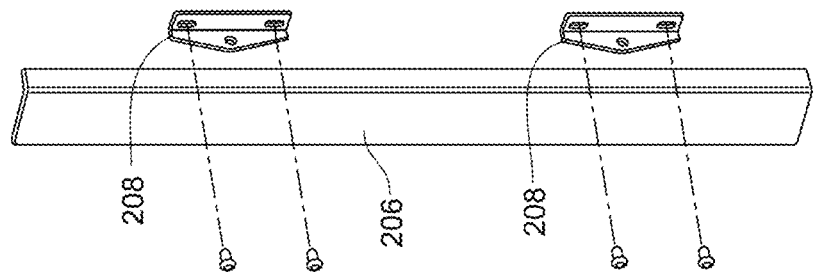
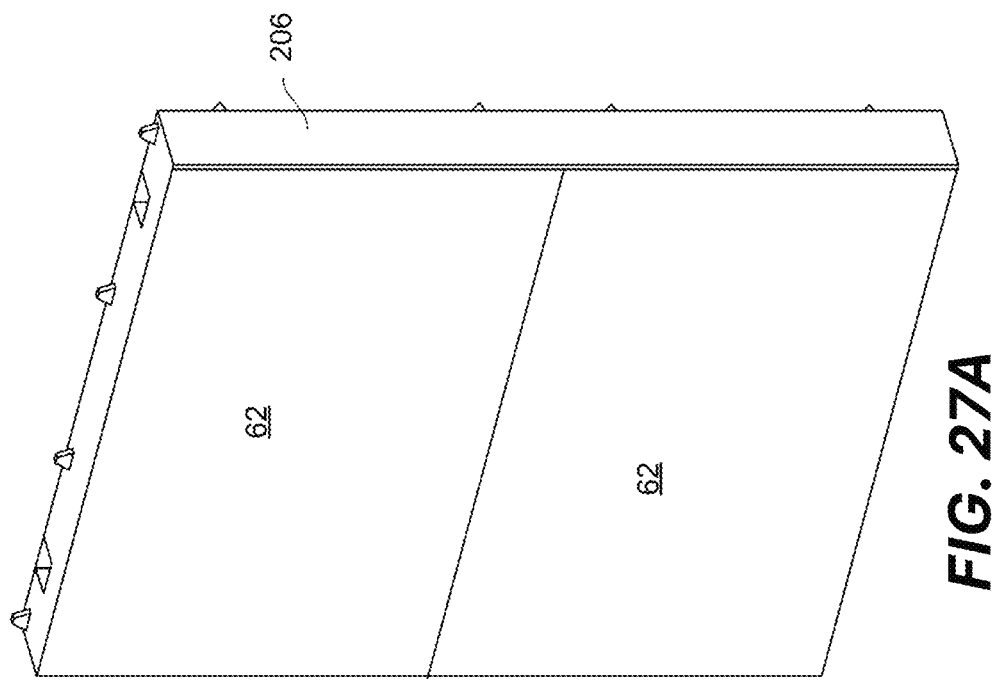
FIG. 27B
FIG. 27A

SCREEN MOUNTING SYSTEM

RELATED APPLICATIONS

The present application is a continuation of U.S. patent application Ser. No. 16/772,924, entitled "SCREEN MOUNTING SYSTEM," filed Jun. 15, 2020, which claims priority to PCT Application No. PCT/US2018/066094, entitled SCREEN MOUNTING SYSTEM, filed Dec. 17, 2018, and claims the benefit of U.S. Provisional Patent Application No. 62/599,660, filed Dec. 15, 2017, which are all hereby fully incorporated herein by reference in their entirety.

TECHNICAL FIELD

The present invention relates to mounting systems for televisions and monitors, and in particular to mounting systems for an array of televisions and monitors.

BACKGROUND

It is increasingly common in public spaces to mount LED, LCD or other flat panel display type televisions or monitors (electronic display devices) to form an overall display that can be easily changed for the purpose of presenting information, advertising, or entertainment. Often, several of these devices are mounted adjacent to form an overall display larger than can be done with a single electronic display.

Prior mounting solutions for multiple electronic displays present certain drawbacks. For example, such mounts can be difficult and cumbersome to assemble. These mounts sometimes do not offer adjustibilty to account for external factors such as walls that are not entirely flat, leading to an unattractive installation. Also, the mounts are not easily scalable, so that different models must be offered depending on the size of the array of electronic displays desired.

What is still needed in the industry is a mounting system for multiple electronic displays that overcomes these drawbacks.

SUMMARY

The present invention provides a mounting solution for arrays of electronic display devices that addresses the drawbacks of prior mounts. According to embodiments of the invention, scalably sized modular mounting frames can be easily assembled and linked together to form a mounting system that can accommodate multiple vertically and horizontally adjacent electronic displays. The system can have adjustable mounting legs enabling correction for walls, to which the system will be mounted, that are not entirely flat and also enabling positioning of the overall system within a range of adjustment closer or further away from the wall.

The modular configuration of the mounting system can provide for vertical attachment of multiple electronic displays to a single module, and for vertical and horizontal attachment of multiple modules. The disclosed modular system enables multiple displays to be mounted in a virtually unlimited number of shapes as well as the standard square and rectangular arrays.

Elongated attachment slots enable an electronic display to be moved laterally while adjacent electronic displays are being installed so that the electronic displays do not necessarily contact each other during initial installation so as to prevent damage to the individual electronic displays. The elongated attachment slots also enable horizontal adjustment of the electronic displays to compensate for tolerance build-ups so as to ensure the displays can be slid together tightly in the horizontal (lateral) direction during final installation.

In some embodiments, a pusher mechanism can be included that will push against the display fasteners during installation so as to enable the electronic display devices to be pushed tightly together and inhibit unauthorized removal. In some embodiments, slots can placed at key-points on the mount to enable a tape measure to be used during installation, thereby easing measurements during installation.

In an embodiment, a system for mounting multiple electronic display devices to a wall of a structure includes a first pair of spaced-apart brackets, each bracket presenting a front flange defining a plurality of slots, each slot adapted to receive a fastener coupled to an electronic display so as to attach the electronic display to the bracket, and a plurality of mounting feet operably coupled to each of the spaced-apart brackets, each of the mounting feet adapted to attach to the wall and defining a slot enabling the mounting foot to shift parallel to a plane of the wall, each of the plurality of mounting feet being separately shiftable relative to the spaced-apart brackets so as to enable the bracket to be selectively adjusted for position in a direction perpendicular to the wall.

According to embodiments, each of the plurality of mounting feet is shiftable relative to the spaced-apart brackets with an adjustment screw assembly. The slots defined in each mounting foot can be teardrop shaped, and the slots defined in the spaced-apart brackets can be teardrop shaped.

In embodiments, the system can further include a second pair of spaced-apart brackets, each of the second pair of brackets presenting a front flange defining a plurality of slots, each slot adapted to receive a fastener coupled to an electronic display so as to attach the electronic display to the second pair of spaced-apart brackets and a plurality of mounting feet operably coupled to each of the second pair of spaced-apart brackets, each of the mounting feet adapted to attach to the wall and defining a slot enabling the mounting foot to shift parallel to a plane of the wall, each of the plurality of mounting feet being separately shiftable relative to the spaced-apart brackets so as to enable the bracket to be selectively adjusted for position in a direction perpendicular to the wall, the second pair of spaced-apart apart brackets operably coupled to the first pair of spaced-apart brackets in a horizontally or vertically adjacent relation.

In embodiments, the first or the second pair of spaced-apart brackets can receive one, two, three, or four electronic displays, and can be coupled together vertically or horizontally to form arrays of electronic displays of various shapes.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 2 depicts a height adjustable mounting foot assembly used in the configurations of FIGS. 1a, 1b, and 1c;

FIG. 21A is a rear elevation view of the mounting system of FIG. 12 with electronic displays attached;

FIG. 21B is an elevation view of the portion of FIG. 21A designated by inset 21B;

FIG. 21C is an elevation view of the portion of FIG. 21A designated by inset 21C;

FIG. 21D is an elevation view of the portion of FIG. 21A designated by inset 21D;

FIG. 22A is a front isometric view of the mounting system of FIG. 12, depicting how a measuring device can be used in an embodiment of the invention;

FIG. 22B is an isometric view of the portion of FIG. 22A designated by inset 22B;

FIG. 22C is a front isometric view of the mounting system of FIG. 12, depicting how a measuring device can be used in an embodiment of the invention;

FIG. 22D is an isometric view of the portion of FIG. 22C designated by inset 22D;

FIG. 24A is a front elevation view of multiple mounts according to FIG. 12, 14, 15, or 25 attached in a horizontal array in the predetermined shape of FIG. 23A, but with electronic displays attached;

FIG. 24B is a front elevation view of multiple mounts according to FIG. 12, 14, 15, or 25 attached in a horizontal array in the predetermined shape of FIG. 24B, but with electronic displays attached;

FIG. 26A is a front elevation view of the mount of FIG. 25;

FIG. 26B is a partial phantom depiction of a limit structure for limiting horizontal sliding of displays during installation and use of the mounts of FIGS. 1-25;

FIG. 27A is a front isometric view of the device of FIGS. 12 and 25 with a side cover and electronic displays attached; and FIG. 27B is a rear exploded isometric view of the device of FIG. 27A.

Figure 1C:
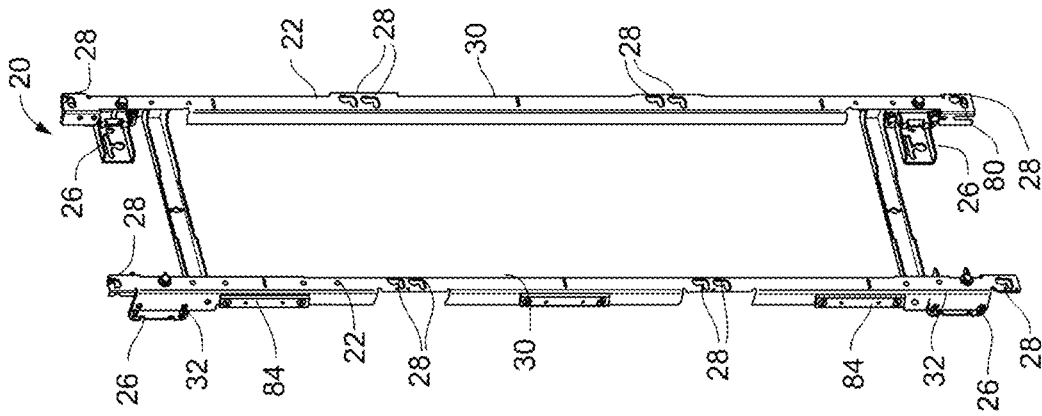
FIG. 1C depicts a mounting system for mounting three electronic displays in a vertically adjacent configuration according to an embodiment of the invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

There is depicted in FIGS. 1-11 a mounting system according to embodiments of the invention. A mount 20 for a single (1×1) electronic display device depicted in FIGS. 1A and 8 generally includes brackets 22, 23, cross-braces 24, and mounting foot assemblies 26. Brackets 22, 23, define teardrop slots 28 in front facing flanges 30. Side facing flanges 32 of brackets 22, 23, define apertures receiving fasteners 34, and keyhole slots 36. Cross-braces 24 are secured to each of brackets 23, 23, with fasteners 38, and hold brackets 22, 23, in a parallel, spaced apart relation.

Figure 9:
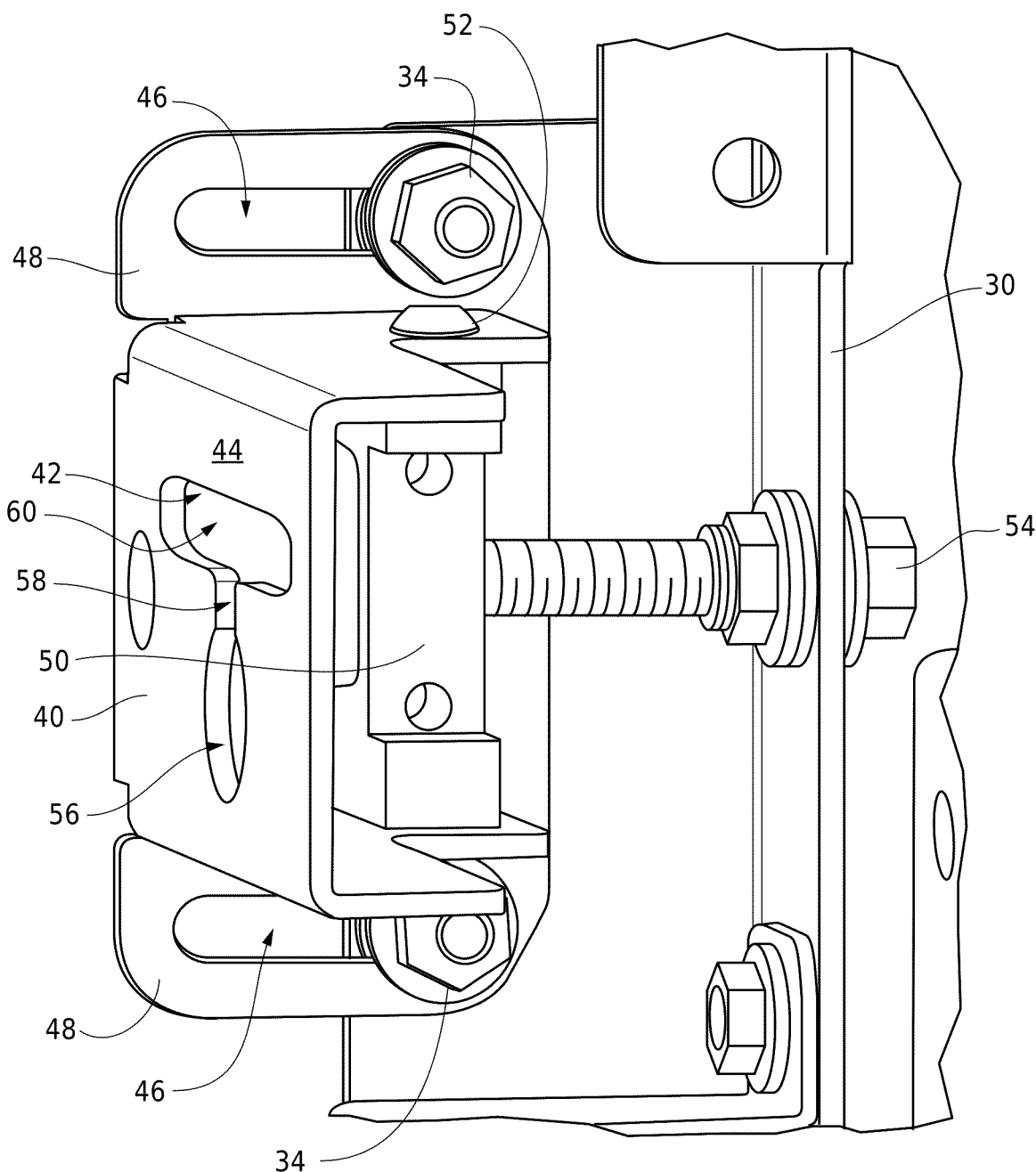
FIG. 9 is a partial rear isometric view of a mounting foot assembly according to an embodiment of the system of the invention.
Figure 10:
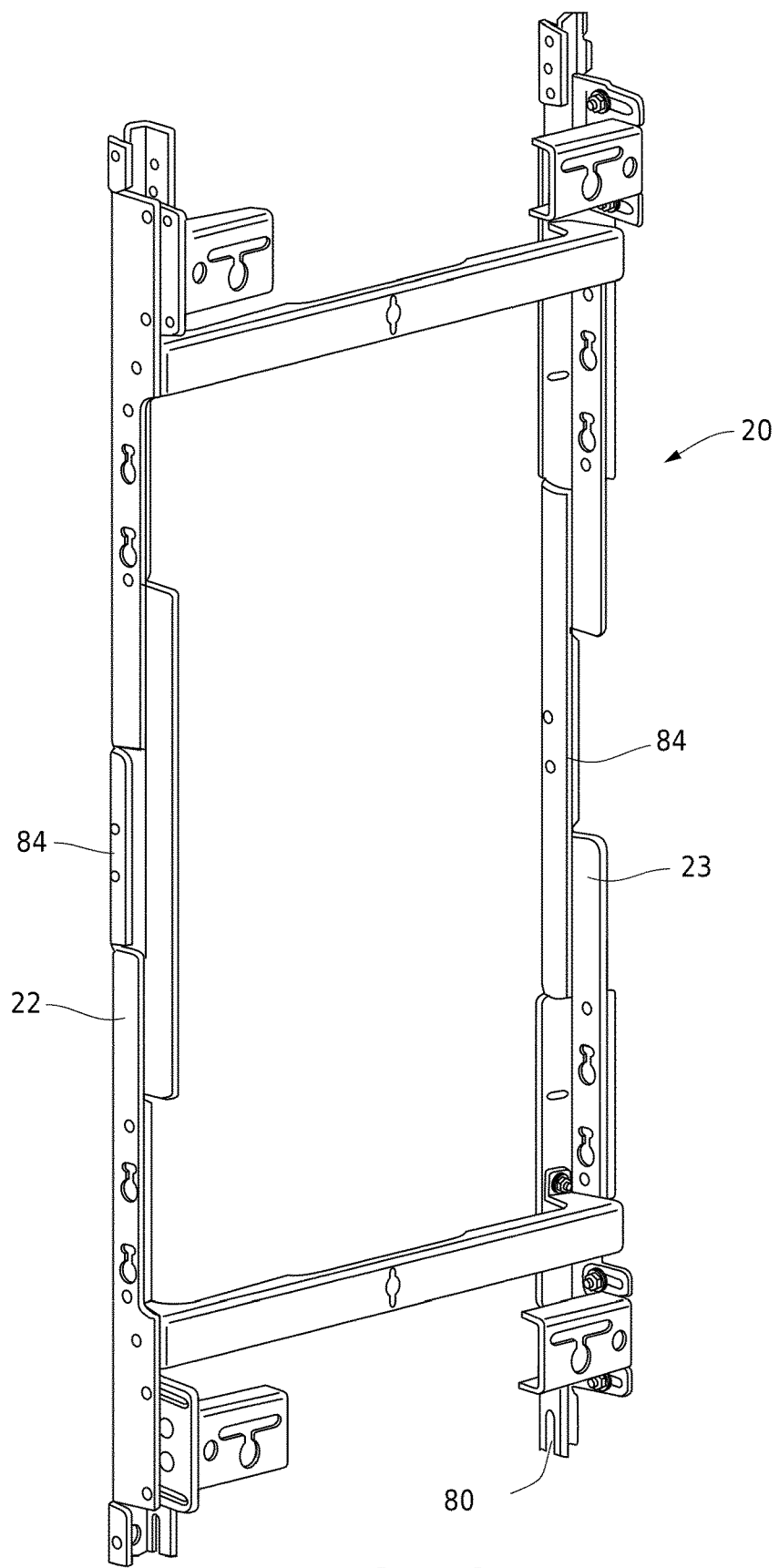
FIG. 10 is a rear isometric view of the mounting system of FIG. 1B.
Figure 11:
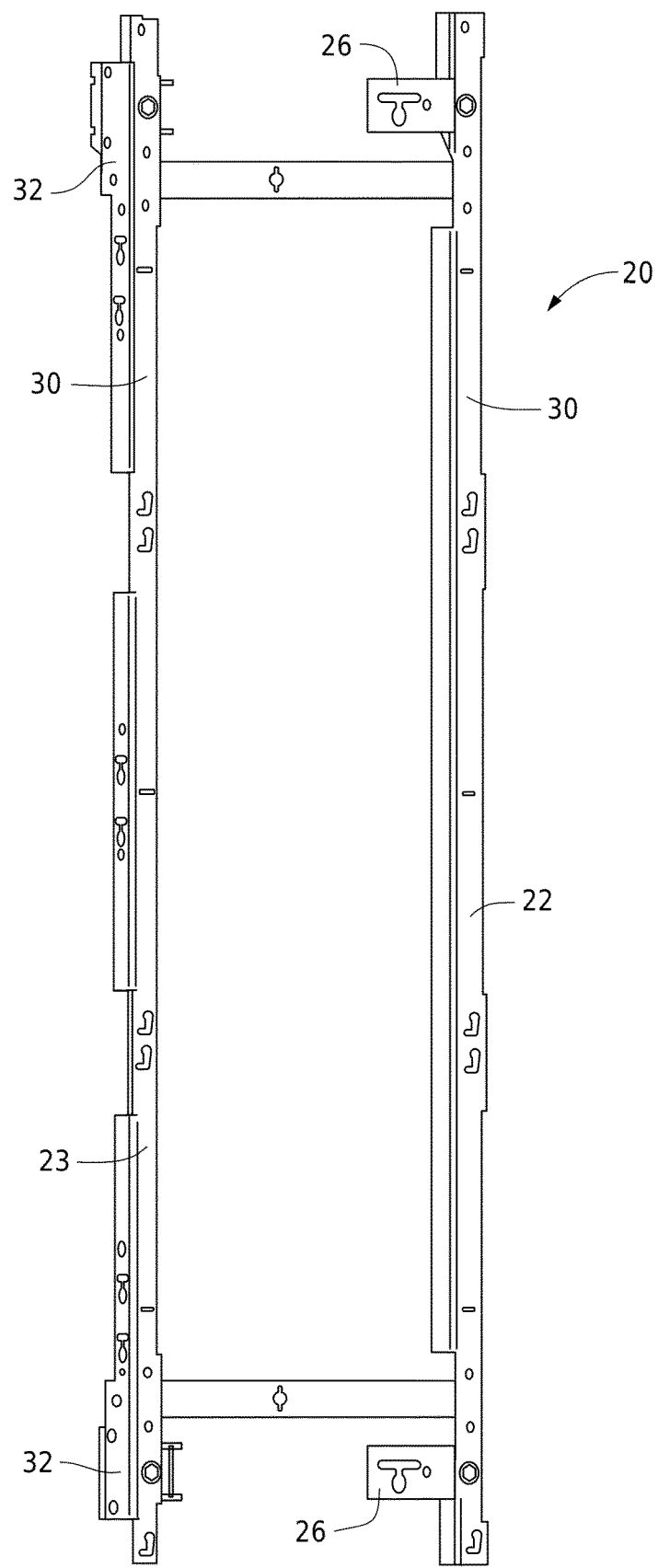
FIG. 11 is a front isometric view of the mounting system of FIG. 1C.

As depicted in FIGS. 2 and 9, mounting foot assemblies 26 generally include mounting bracket 40 defining keyhole slot 42 on lateral flange 44, and adjustment slots 46 on perpendicular flange 48. Adjustment block 50 is rigidly attached to mounting bracket 40 with fasteners 52, and receives adjustment screw assembly 54. Mounting foot assemblies 26 are adjustably coupled to brackets 22, 23, with adjustment screw assembly 54, and with fasteners 34 slidably received in adjustment slots 46 such that turning adjustment screw assembly 54 causes lateral flange 44 to be moved closer or further away from front facing flanges 30, depending on the direction of rotation of adjustment screw 54.

In use, mount 20 can be attached to a wall with fasteners (not depicted) through keyhole slots 42. The head of fastener already projecting from the wall can be advanced through round portion 56 of slot 42 and then mount 20 moved downward so that the fastener moves through neck portion 58 and into lateral slot portion 60. From there, mount 20 can be slid horizontally, guided by lateral slot portion 60 so that mount 20 can be adjusted for lateral position on the wall. The position of front facing flanges 30 can be adjusted relative to the wall by turning adjustment screw 54. As there are generally four mounting feet 26 for mount 20, the front facing flanges 30 can be adjusted to enable an attached screen to be adjusted in roll and pitch relative to the wall and other displays mounted adjacent.

Figure 3C:
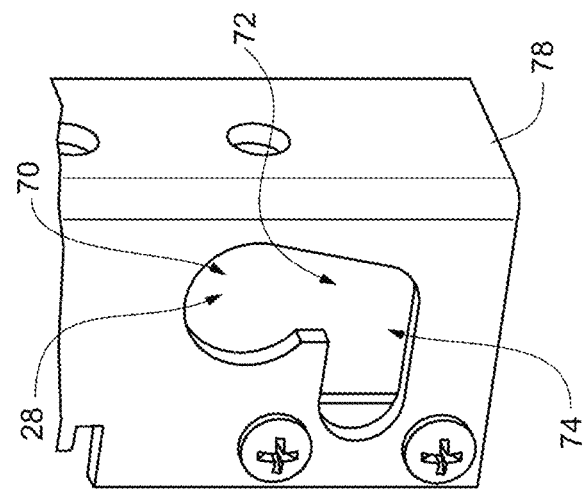
FIG. 3C is an isometric view of a teardrop slot used in the mounting system of FIGS. 1A-1C.
Figure 3B:
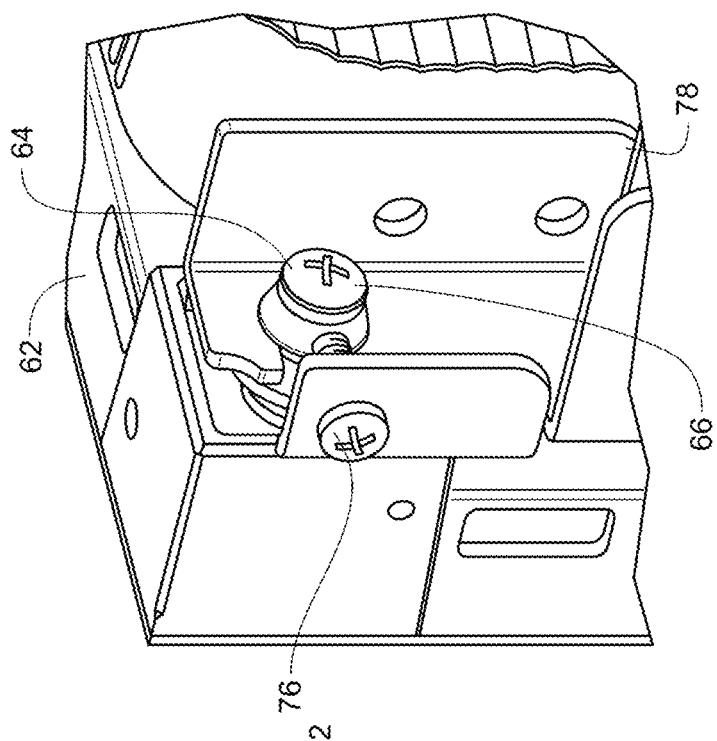
FIG. 3B is an isometric view of a button fastener attached to an electronic display device with the button fastener received in a slot of the mounting system of FIGS. 1A-1C.
Figure 3A:
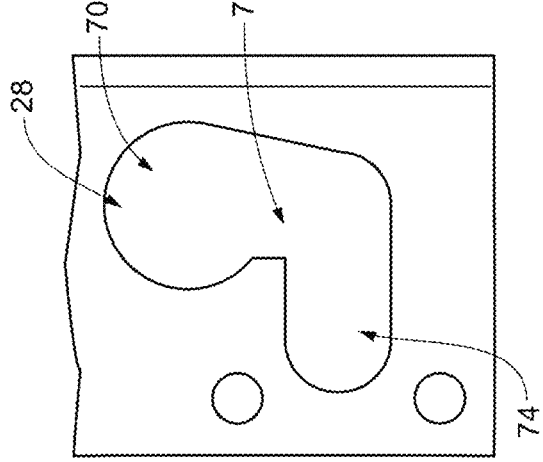
FIG. 3A is a front elevation view of a teardrop slot used in the mounting system of FIGS. 1A-1C.

Screen 62 is attached to mount 20 with fastening buttons 64. Each fastening button 64 has head portion 66 and neck portion 68. Head portion 66 is advanced through rounded portion 70 of teardrop slot 28, and screen 62 moved downward so that neck portion 68 moves through narrow portion 72 and into lateral slot 74. From there, screen 62 can be slid laterally with neck portion 68 guided in lateral slot 74. The position of fastening button 64 in teardrop slot 28 can be adjusted and secured with pusher screw 76 received in apertures provided in brackets 22, 23, and using stop block 78 as depicted in FIG. 3.

Figure 1B:
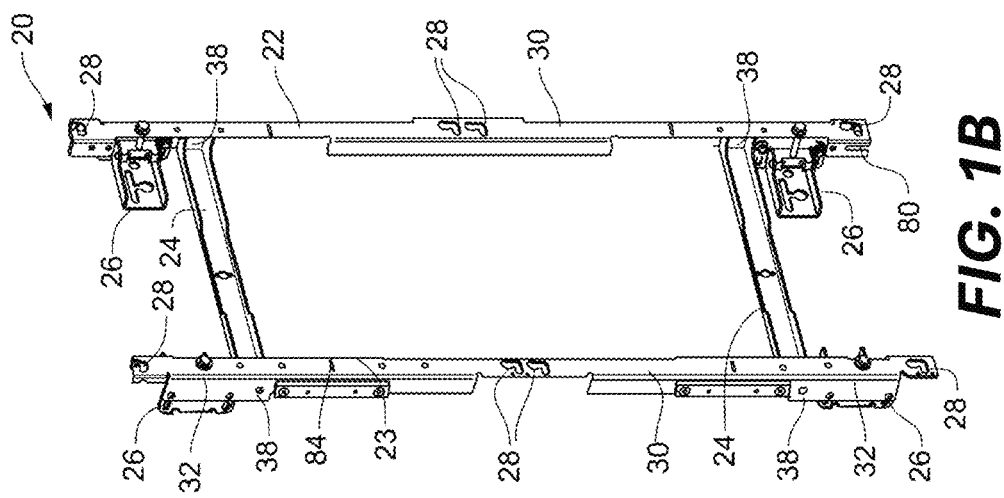
FIG. 1B depicts a mounting system for mounting two electronic displays in a vertically adjacent configuration according to an embodiment of the invention.
Figure 1A:
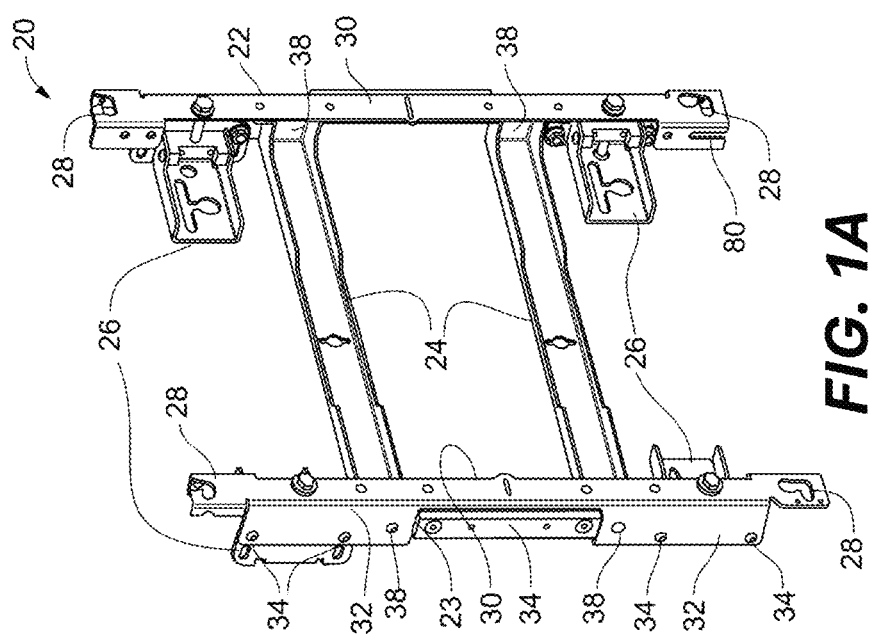
FIG. 1A depicts a mounting system for mounting a single electronic display according to an embodiment of the invention.
Figure 4B:
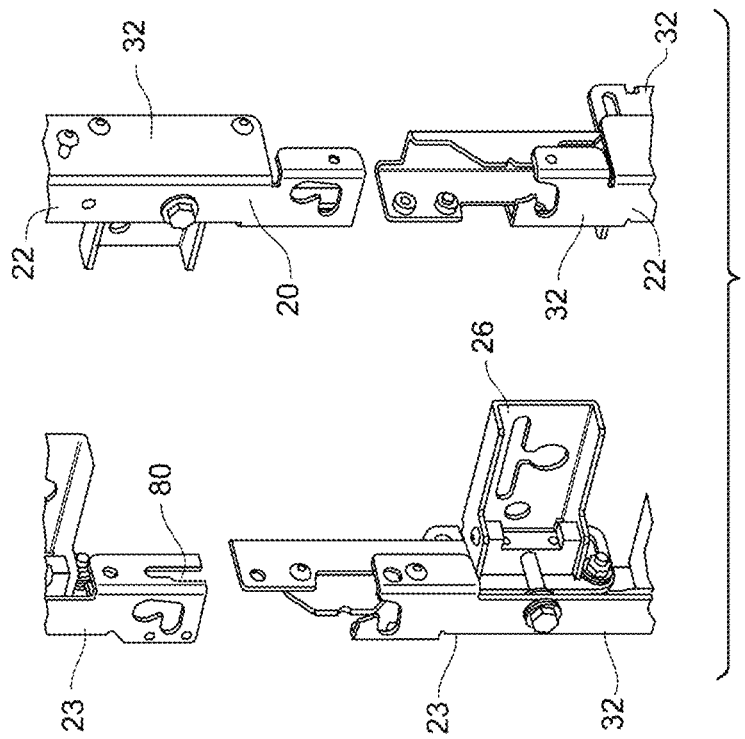
FIG. 4B is an isometric view of vertical coupling of multiple mounting systems as depicted in FIGS. 1A-1C according to embodiments of the invention.
Figure 4A:
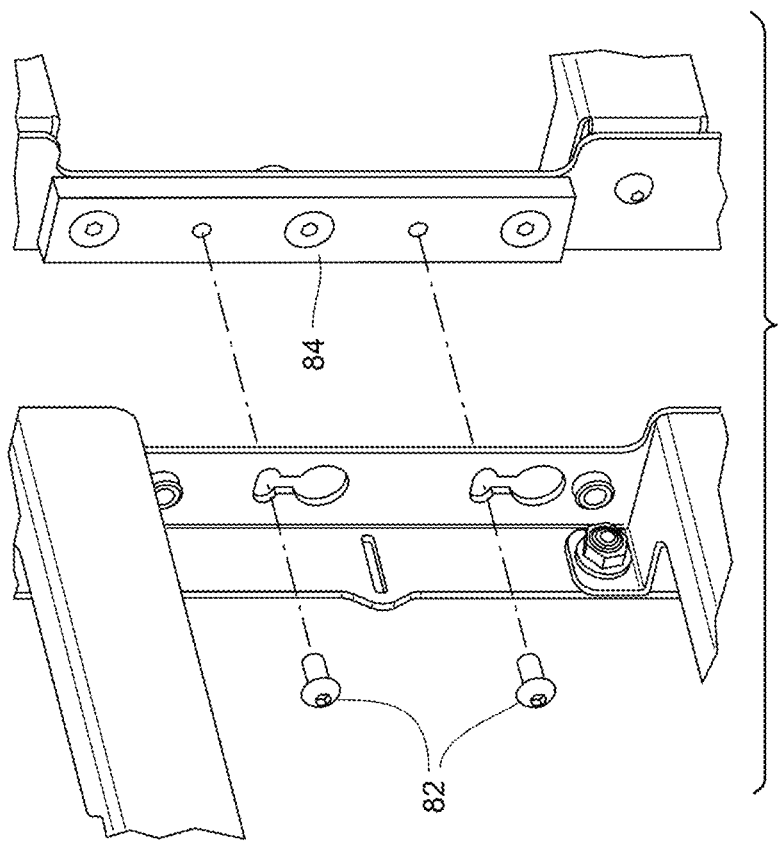
FIG. 4A is an exploded isometric view of horizontal coupling of multiple mounting systems as depicted in FIGS. 1A-1C according to embodiments of the invention.
Figure 5B:
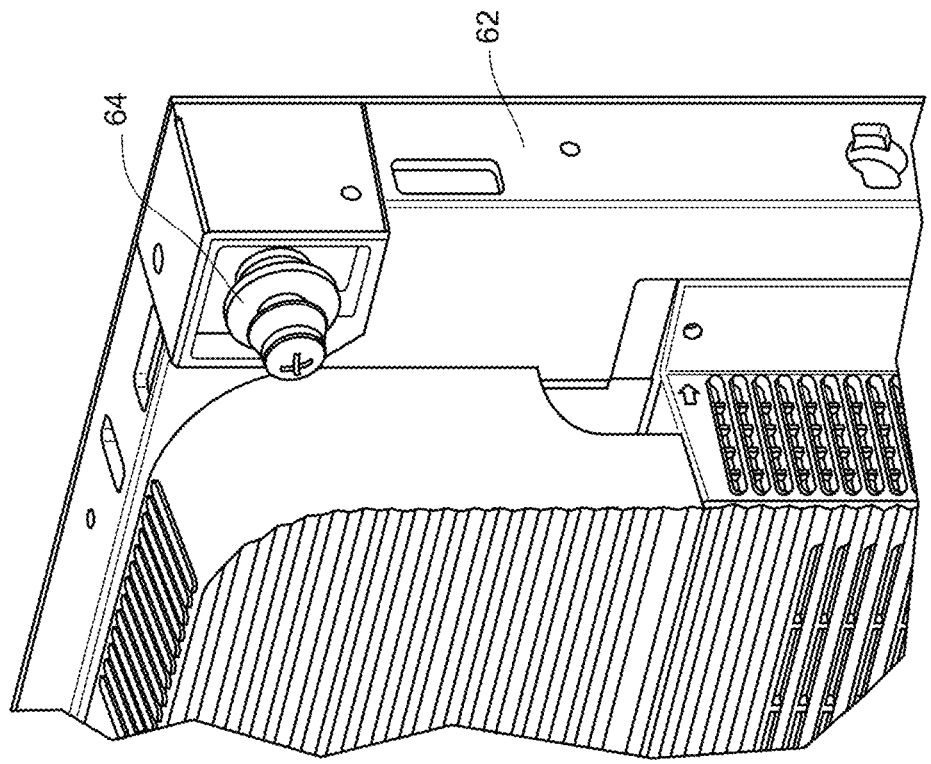
FIG. 5B depicts the mounting button of FIG. 5A attached to an electronic display device.
Figure 5A:
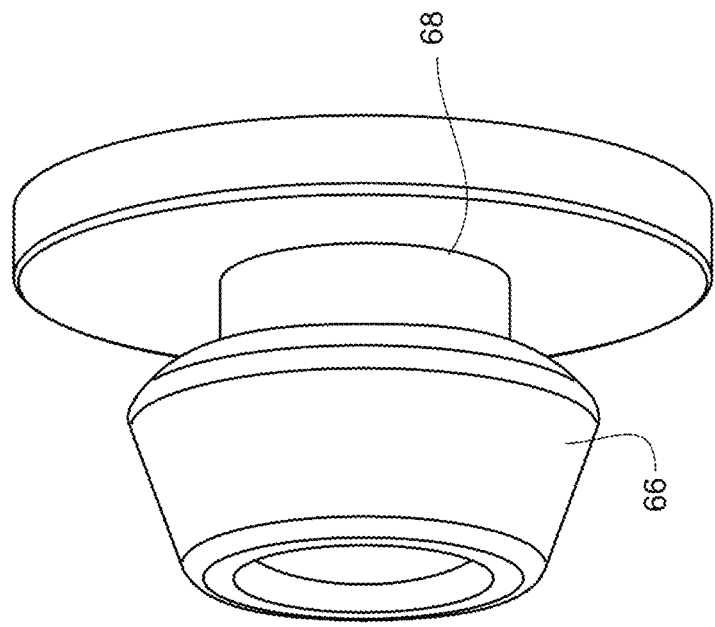
FIG. 5A depicts a mounting button attachable to an electronic display device and usable with the mounting system of FIGS. 1A-1C.
Figure 6B:
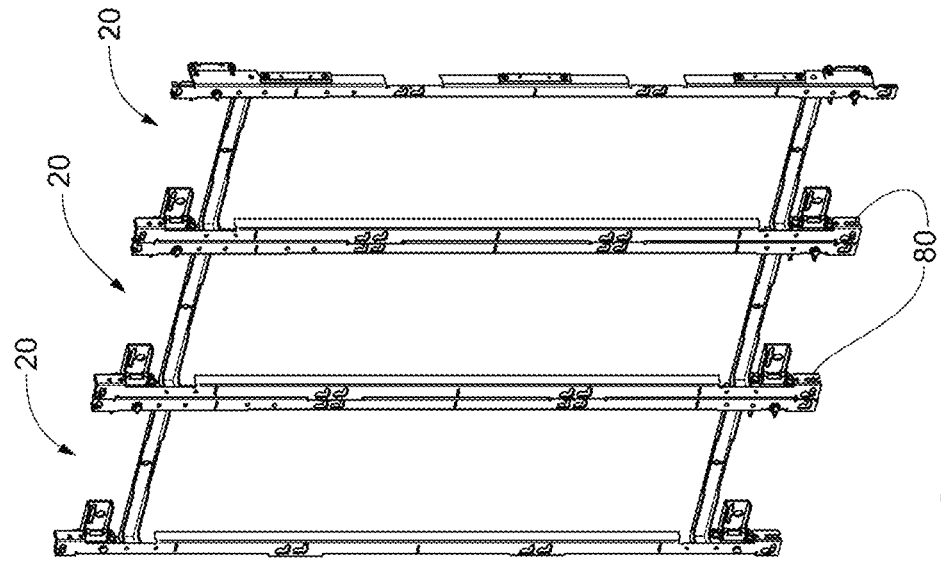
FIG. 6B is an isometric view of three mounting systems, each enabling three electronic displays to be coupled vertically, the three mounting systems coupled horizontally to make an array.
Figure 6A:
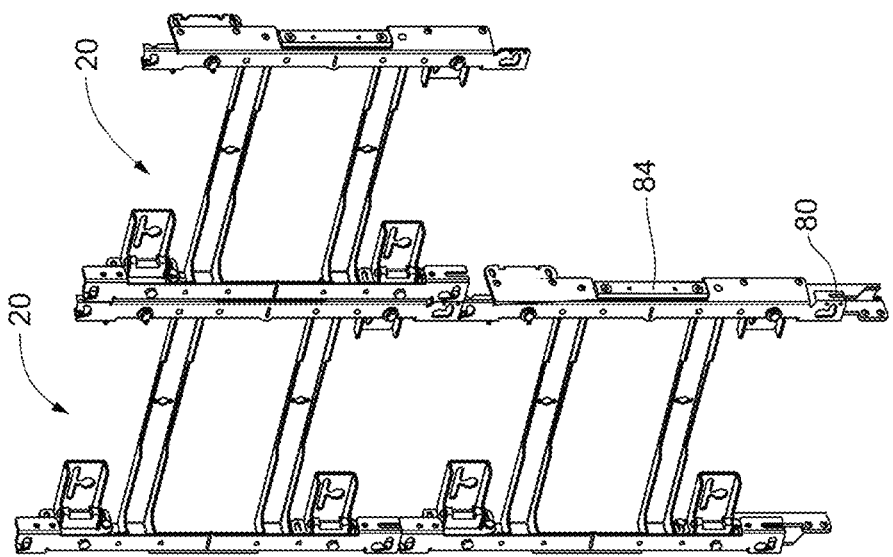
FIG. 6A is an isometric view of two mounting systems, one enabling three displays to be coupled vertically, and with one enabling a single display to be attached, the two mounting systems coupled horizontally to make an array.
Figure 7B:
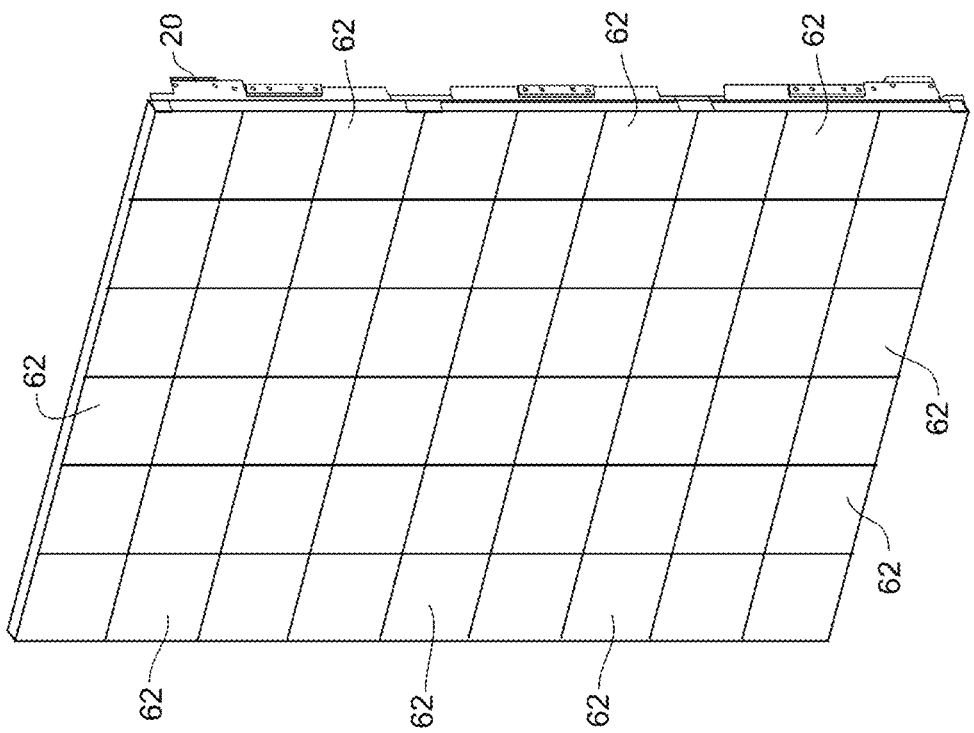
FIG. 7B is a front isometric view of the mounting systems of FIG. 6b with electronic displays attached.
Figure 7A:
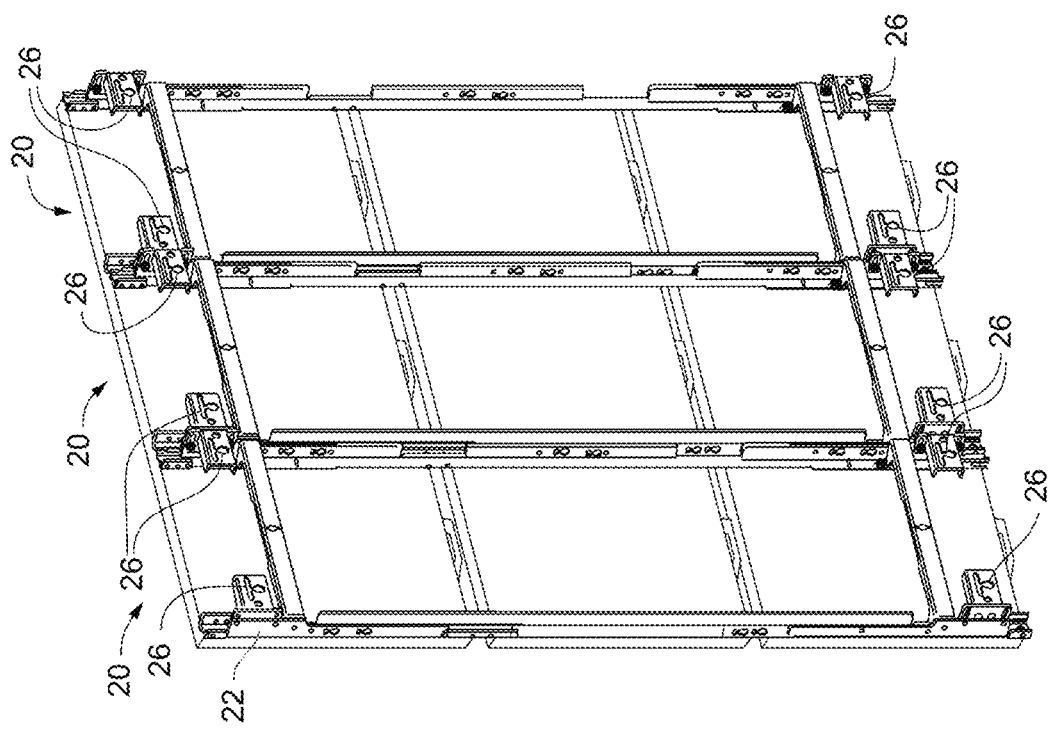
FIG. 7A is a rear isometric view of the mounting systems of FIG. 6b with electronic displays attached.
Figure 8:
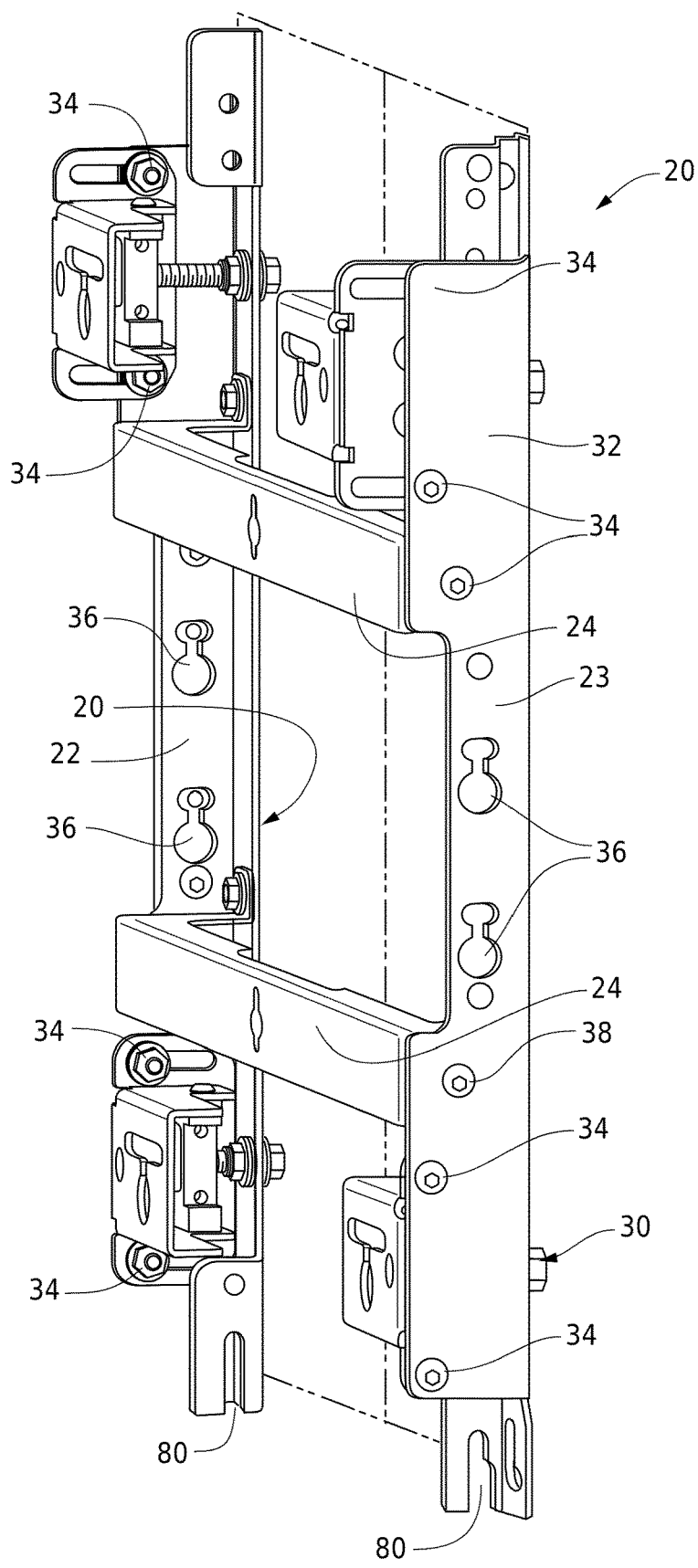
FIG. 8 is a rear isometric view of a 1×1 electronic display mount according to an embodiment of the invention.

The system is modular and scalable for multiple vertically mounted displays as depicted in FIGS. 1A-1C. Brackets 22, 23, can be made an extended length with teardrop slots 28 located at appropriate positions on front facing flanges 30 so as to enable two, three, or more displays to be mounted in a vertical array. Also, multiple mounts 20 can be positioned vertically with fasteners in vertical slots 80 to link the mounts together vertically as depicted in FIG. 4B. In addition, mounts 20 can be linked horizontally as depicted in FIGS. 4A, 6A, and 7A, with fasteners 82 through keyhole slots 36 and received in link bars 84. In this way, virtually unlimited configurations of horizontal and vertical arrays of screens can be achieved.

Figure 12:
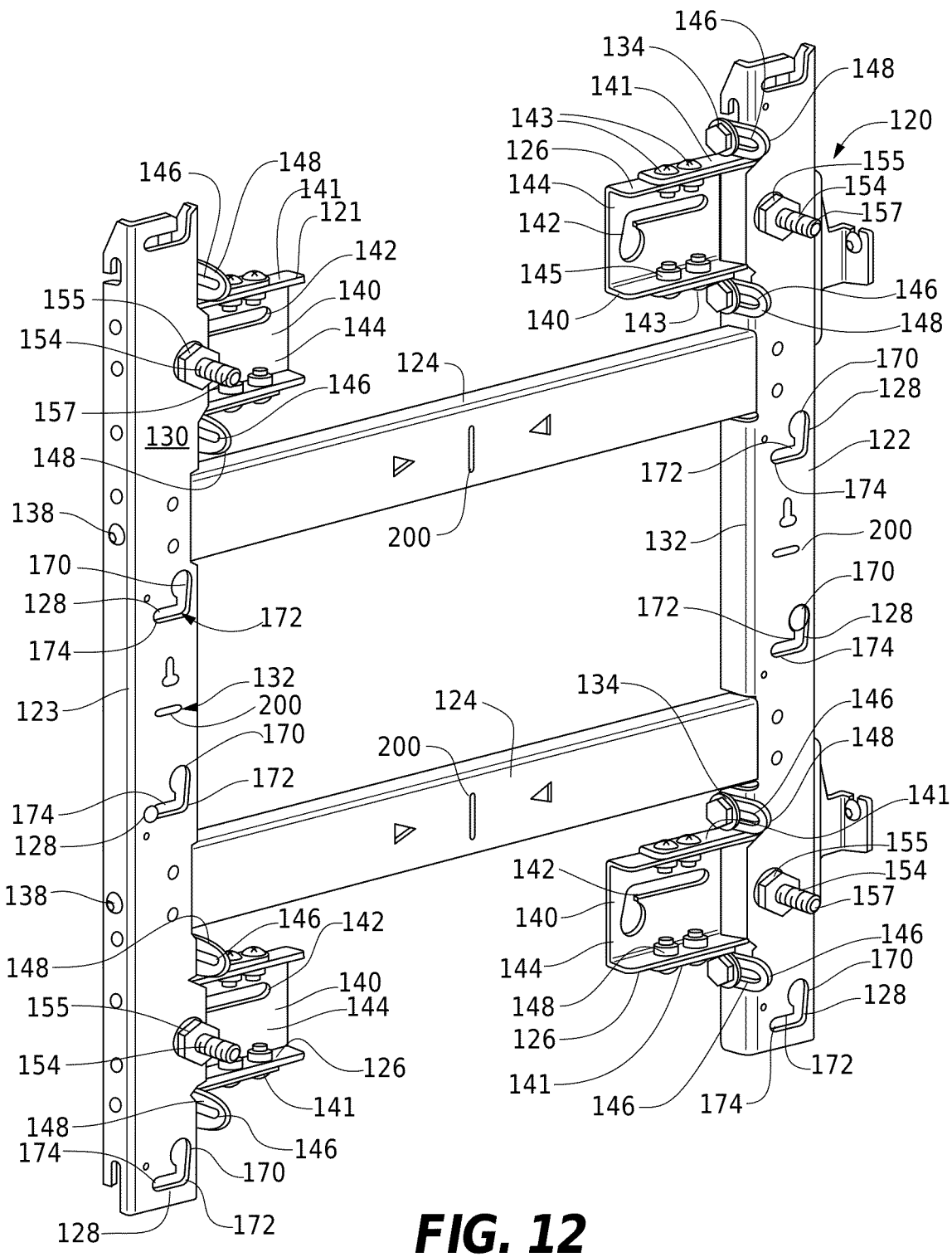
FIG. 12 is a front isometric view of an alternative embodiment of a mounting system according to an embodiment of the invention enabling vertically adjacent mounting of two electronic display devices.
Figure 25:
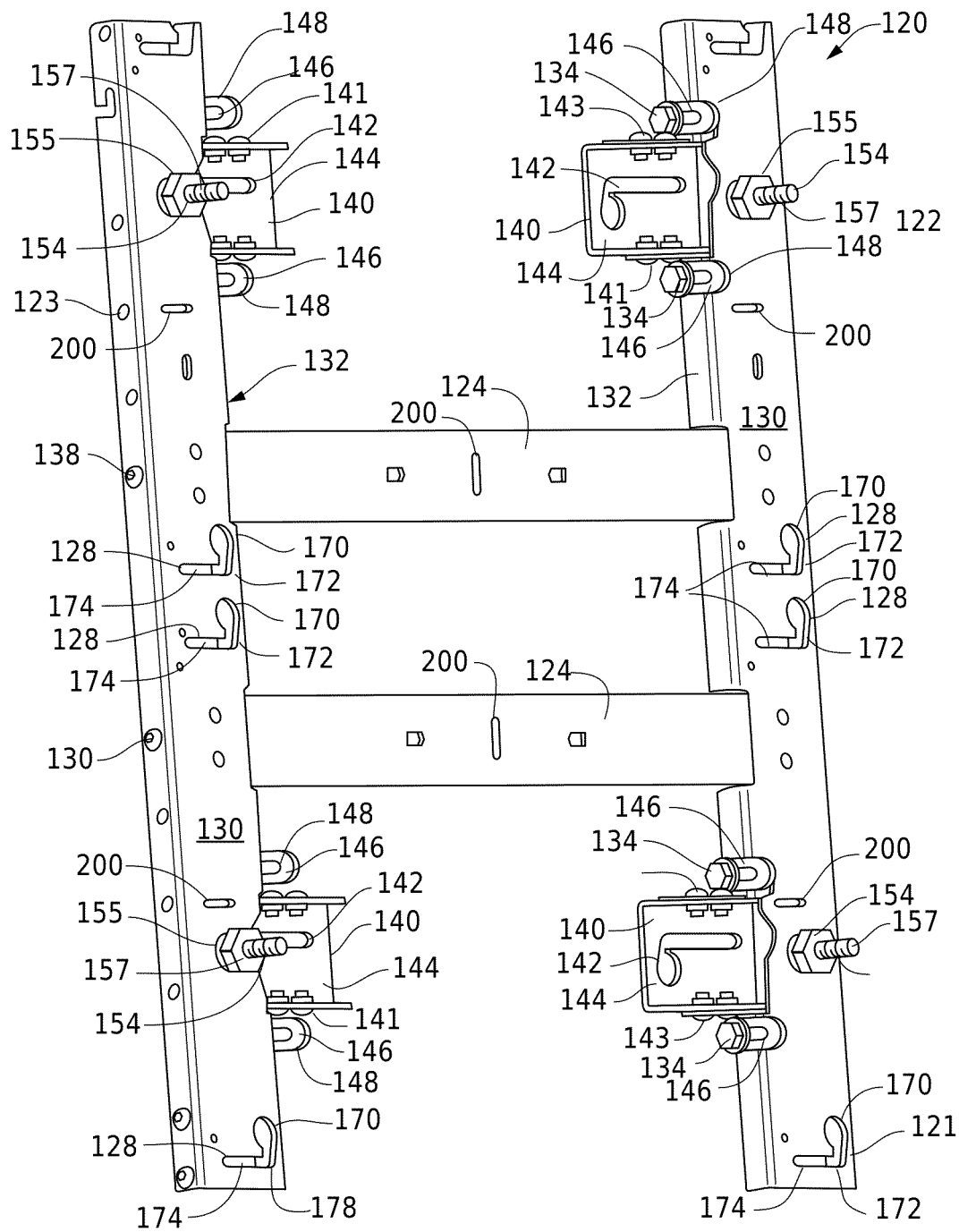
FIG. 25 is a front isometric view of an alternative embodiment of a mounting system according to an embodiment of the invention enabling vertically adjacent mounting of two electronic display devices.

There is depicted in FIGS. 12-27B alternative embodiments of a mounting system according to embodiments of the invention. A mount 120 for two electronic display devices, as depicted in FIGS. 12 and 25, generally includes brackets 122, 123, cross-braces 124, and mounting foot assemblies 126. Brackets 122, 123, define teardrop slots 128 in front facing flanges 130. Side facing flanges 132 of brackets 122, 123, define apertures receiving fasteners 134, and keyhole slots 36. Cross-braces 124 are secured to each of brackets 123, 123, with fasteners 138, and hold brackets 122, 123, in a parallel, spaced apart relation.

Figure 13:
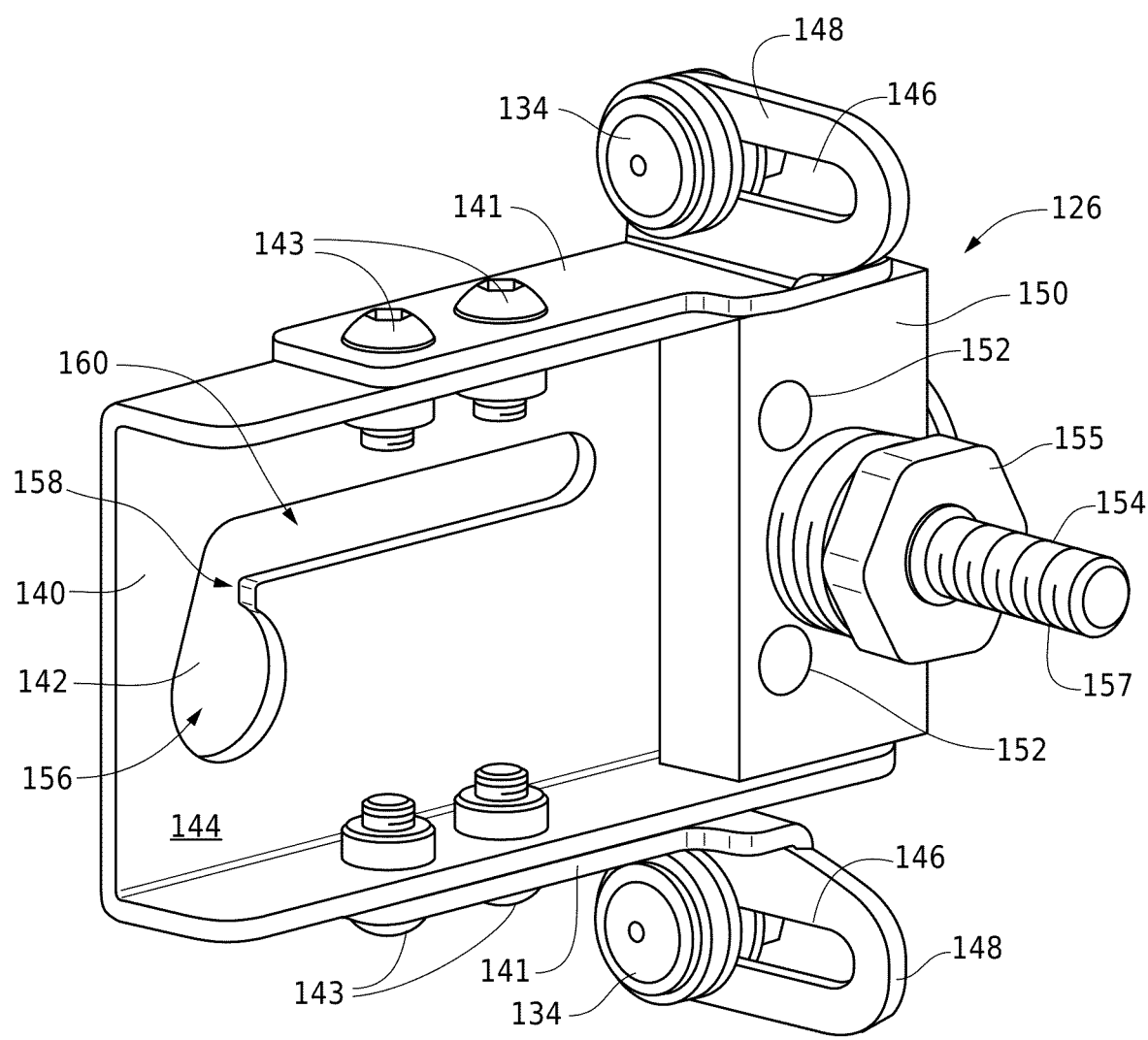
FIG. 13 is a front isometric view of a mounting foot of the device of FIG. 12.
Figure 14:
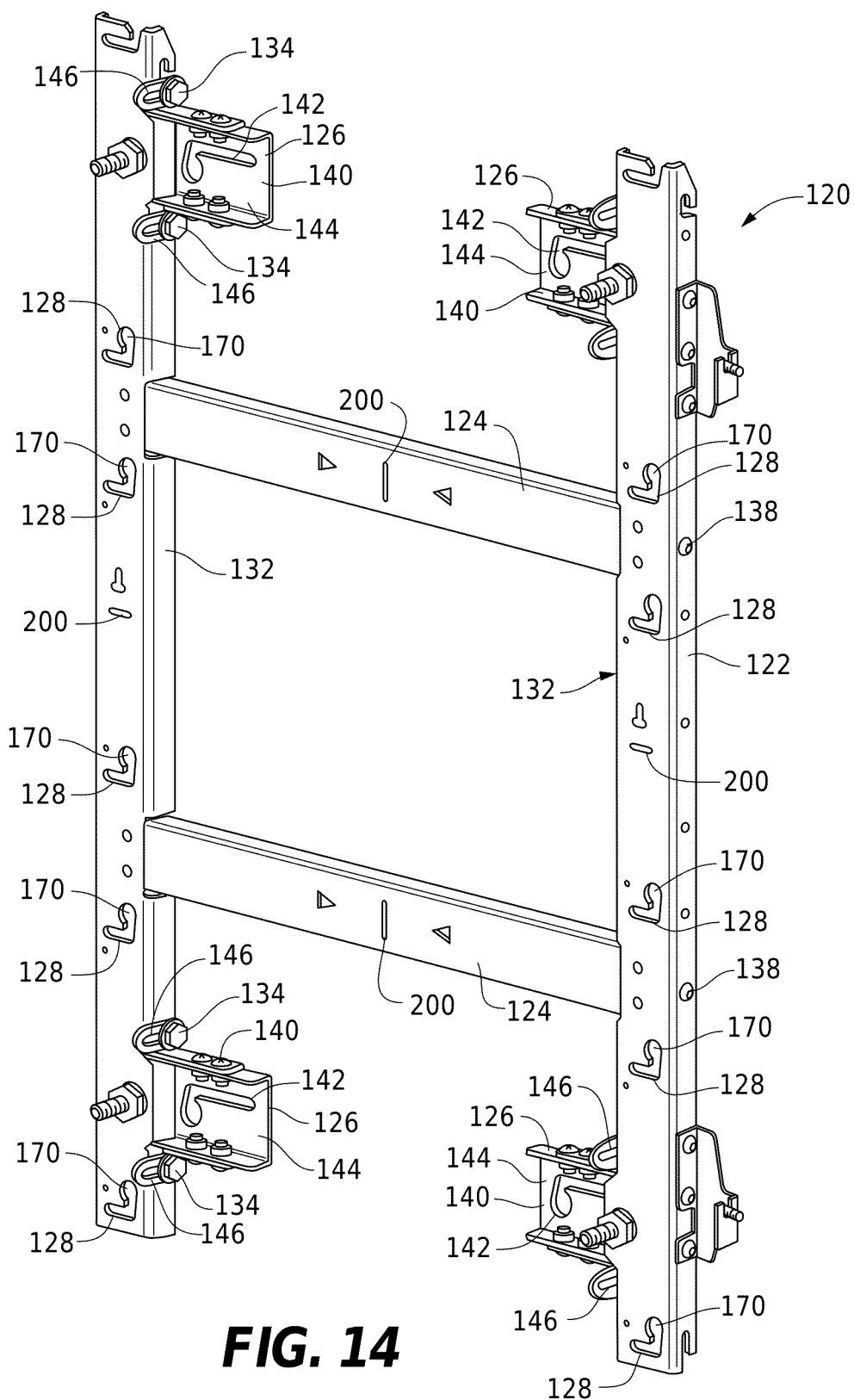
FIG. 14 is a front isometric view of the mounting system of FIG. 12 enabling vertically adjacent mounting of three electronic display devices.
Figure 15:
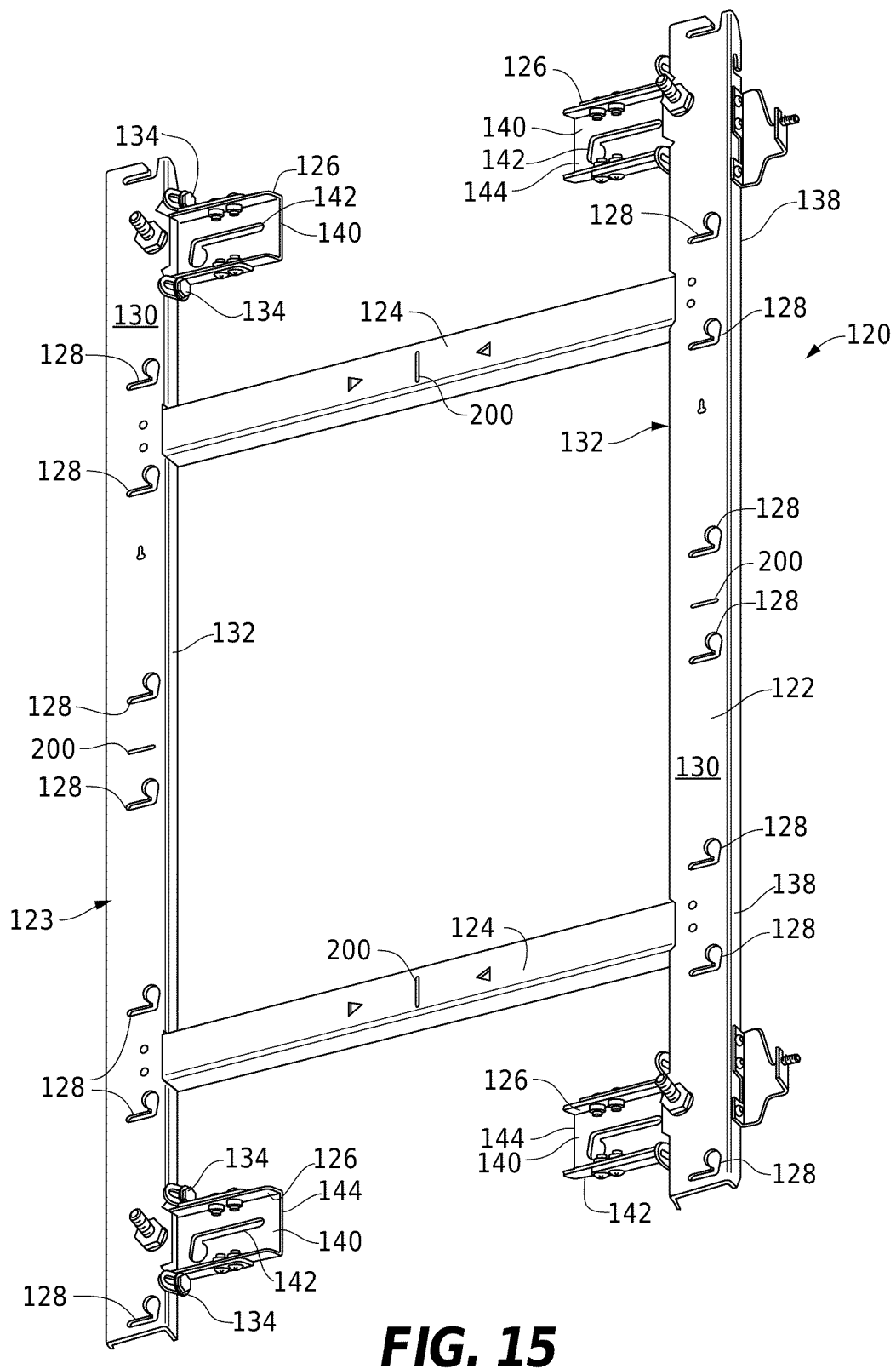
FIG. 15 is a rear isometric view of the mounting system of FIG. 12 enabling vertically adjacent mounting of three electronic display devices.
Figure 16:
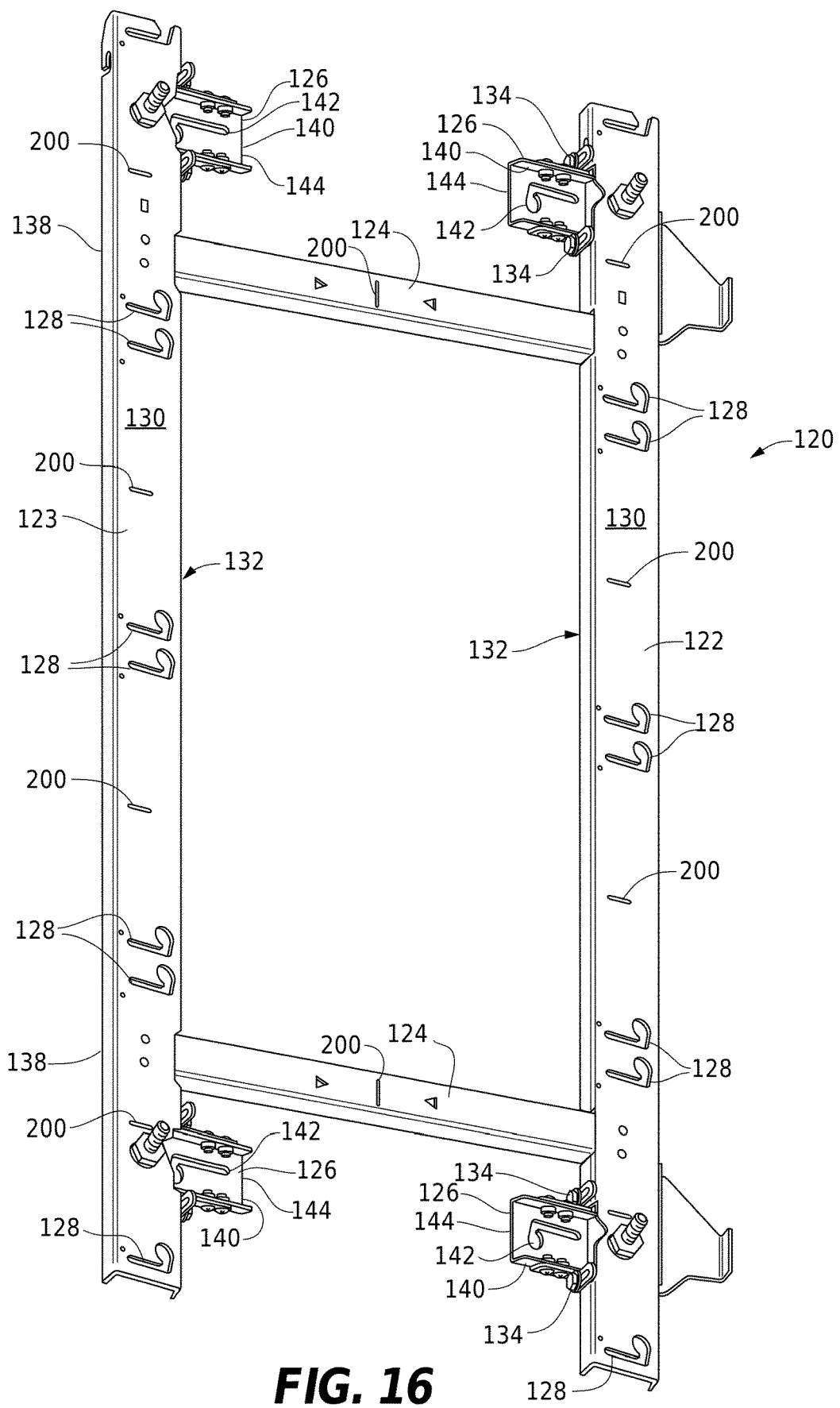
FIG. 16 is a front isometric view of the mounting system of FIG. 12 enabling vertically adjacent mounting of four electronic display devices.
Figure 17:
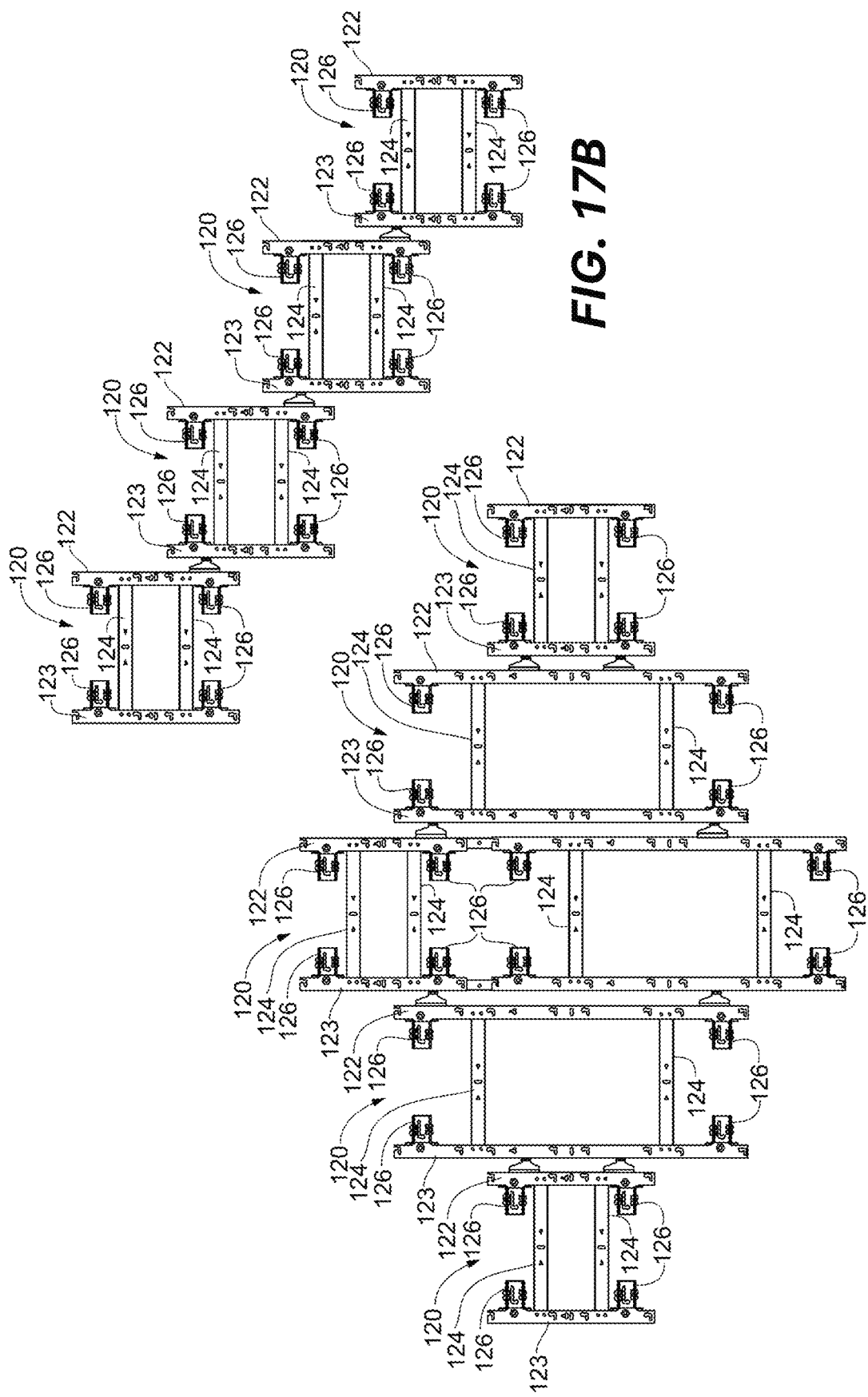
FIG. 17A is a front elevation view of multiple mounts according to FIG. 12, 14, 15, or 25 attached in a horizontal array of a predetermined shape.
FIG. 17B is a front elevation view of multiple mounts according to FIG. 12, 14, 15, or 25 attached in a horizontal array of a different predetermined shape.
Figure 18:
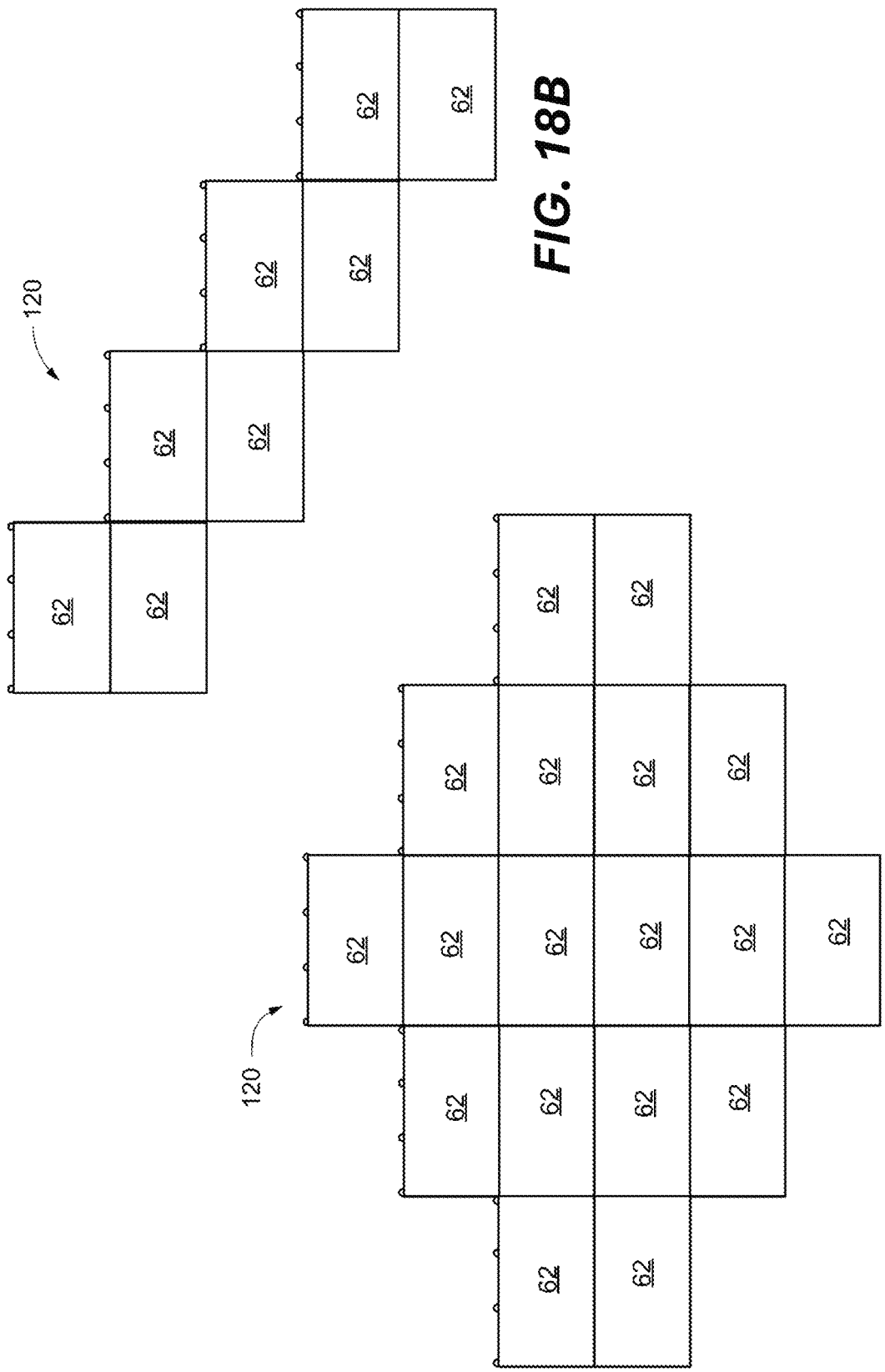
FIG. 18A is a front elevation view of multiple mounts according to FIG. 12, 14, 15, or 25 attached in a horizontal array in the predetermined shape of FIG. 17A, but with electronic displays attached.
FIG. 18B is a front elevation view of multiple mounts according to FIG. 12, 14, 15, or 25 attached in a horizontal array in the predetermined shape of FIG. 17B, but with electronic displays attached.

As depicted in FIGS. 12, 13, and 25, mounting foot assemblies 126 generally include mounting bracket 140, and attachment portion 141, with mounting bracket 140 defining teardrop slot 142 on lateral flange 144. Attachment portion 141 is secured to mounting bracket 140 with fasteners 143. Adjustment slots 146 are defined in perpendicular flanges 148 of attachment portion 141. Adjustment block 150 is rigidly attached to mounting bracket 140 with fasteners 152, and receives adjustment screw assembly 154 with adjustment nut 155 threaded on adjustment screw 157. Mounting foot assemblies 126 are adjustably coupled to brackets 122, 123, through adjustment screw 154, and with fasteners 134 slidably received in adjustment slots 146 such that turning adjustment nut 155 on adjustment screw 154 causes lateral flange 144 to be moved closer or further away from front facing flanges 130, depending on the direction of rotation of adjustment nut 155.

In use, mount 120 can be attached to a wall with fasteners (not depicted) through teardrop slots 142. The head of such a fastener already projecting from the wall can be advanced through lower portion 156 of slot 42 and then mount 120 moved downward so that the fastener moves through neck portion 158 and into lateral slot portion 160. From there, mount 120 can be slid horizontally, guided by lateral slot portion 160 so that mount 120 can be adjusted for lateral position on the wall. The position of front facing flanges 130 can be adjusted inwardly and outwardly relative to the wall by turning adjustment nut 155. As there are generally four mounting feet 126 for mount 120, the front facing flanges 130 can be adjusted to enable an attached electronic display to be adjusted in roll and pitch relative to the wall and other displays 62 mounted adjacent.

As with the embodiments depicted in FIG. 1-11, electronic display 62 is attached to mount 120 with fastening buttons 64. Each fastening button 64 has head portion 66 and neck portion 68 as depicted in FIG. 5A. Each head portion 66 is advanced through rounded portion 170 of teardrop slots 128, and screen 62 moved downward so that neck portion 68 moves through narrow portion 172 and into lateral slot 174. From there, screen 62 can be slid laterally with neck portion 68 guided in lateral slot 174. The position of fastening button 64 in teardrop slot 128 can be adjusted and secured with pusher screw 176 received in apertures provided in side facing flanges 132 of brackets 122 or 123 as depicted in FIG. 21A-21D. A stop fastener 179 can be threaded in to limit lateral travel to a predetermined range as depicted in FIGS. 26A and 26B.

Figure 20B:
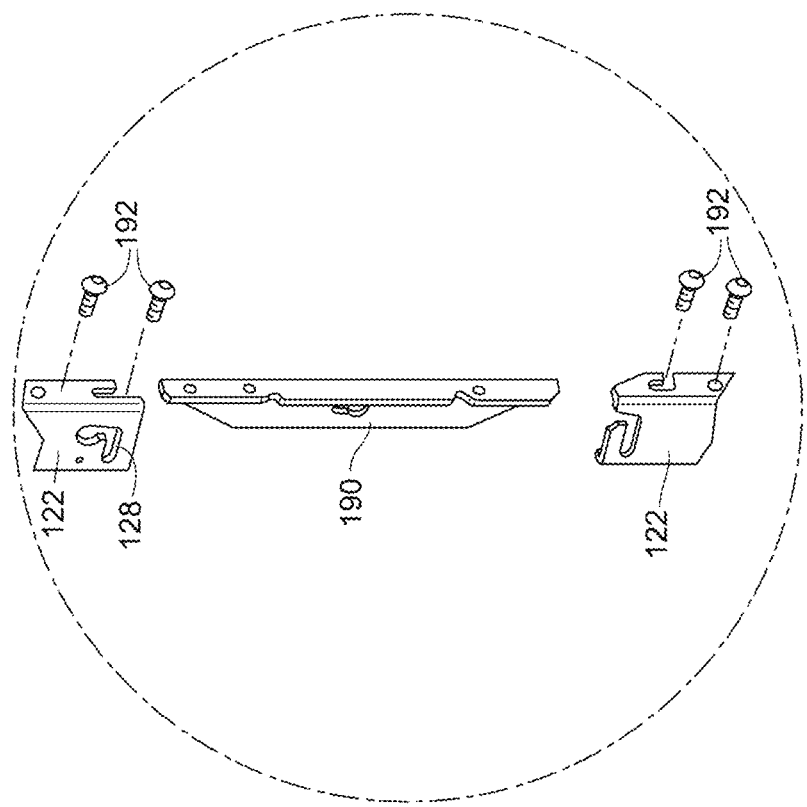
FIG. 20B is an exploded isometric view of the portion of FIG. 20a designated by inset 20b.
Figure 20A:
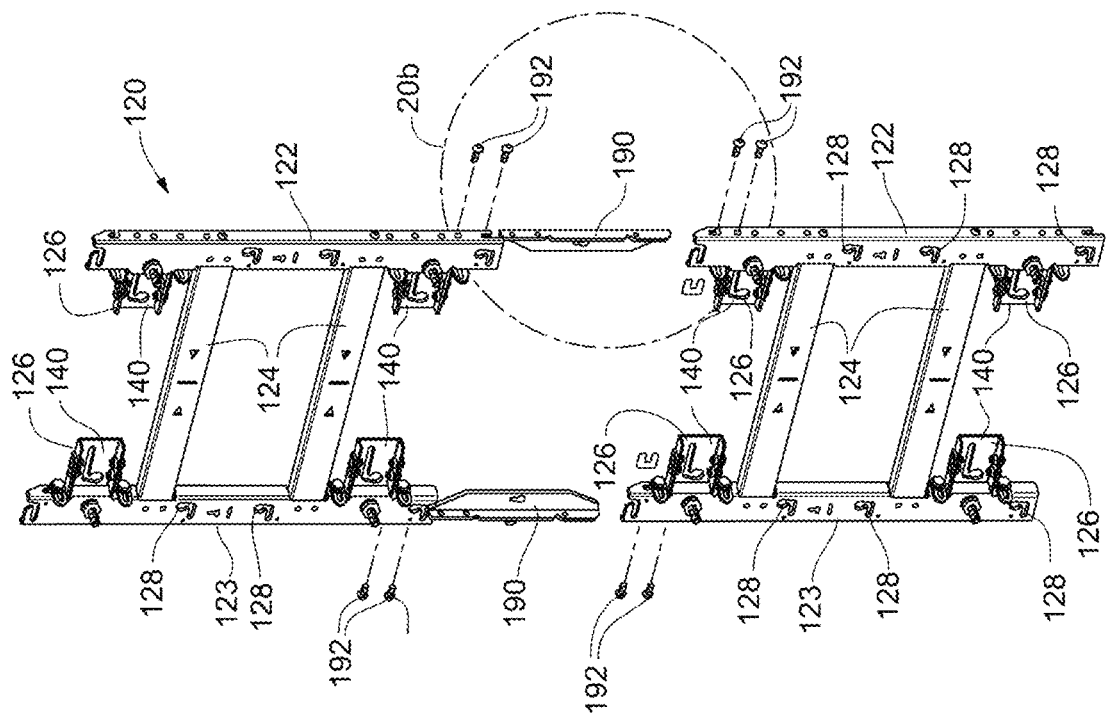
FIG. 20A is an exploded isometric view of vertical attachment of the mounts of FIG. 12.
Figures 23A, 23B:
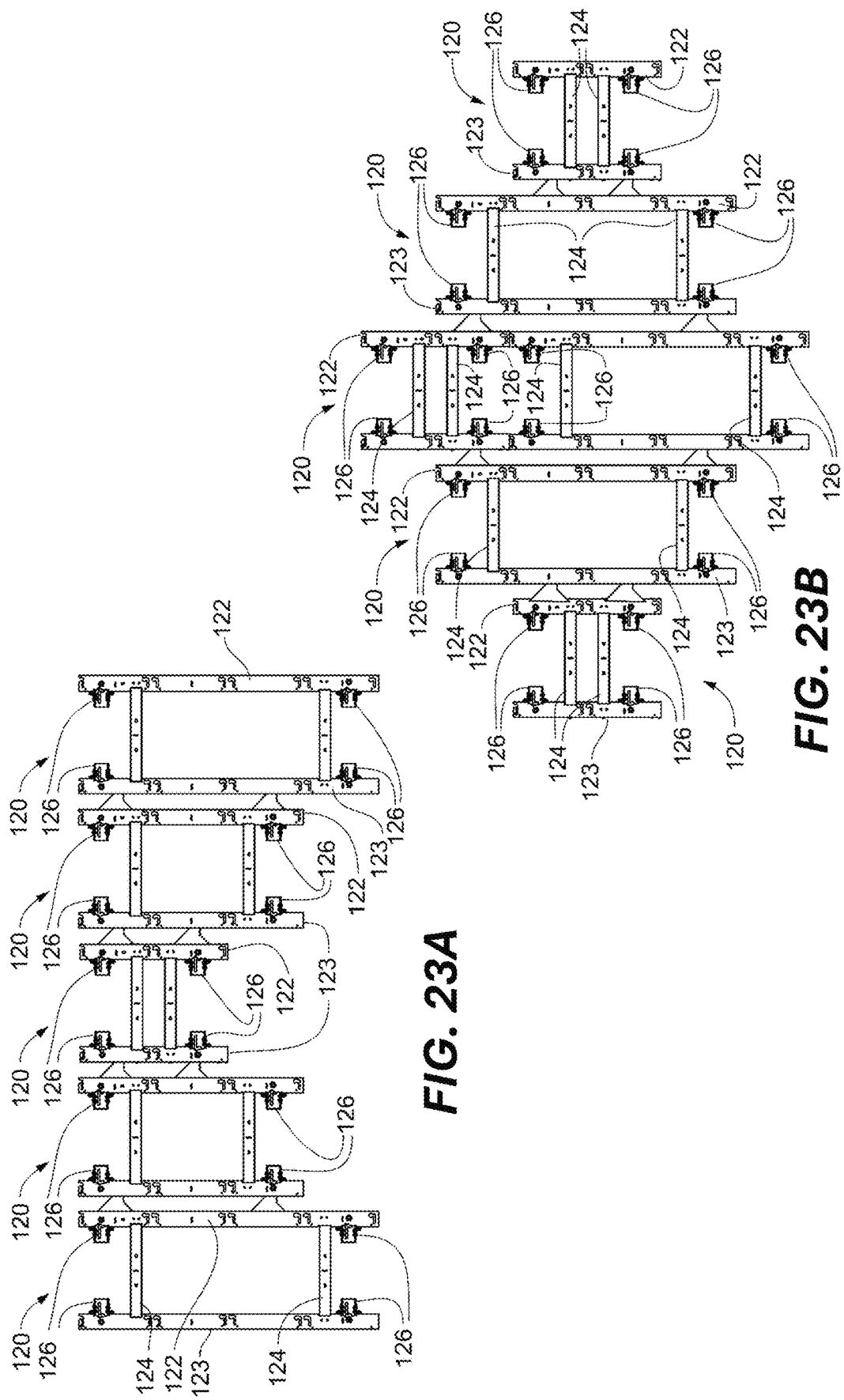
FIG. 23A is a front elevation view of multiple mounts according to FIG. 12, 14, 15, or 25 attached in a horizontal array of a different predetermined shape.
FIG. 23B is a front elevation view of multiple mounts according to FIG. 12, 14, 15, or 25 attached in a horizontal array of a different predetermined shape.

The system is scalable for multiple vertically mounted displays as depicted in FIGS. 12, 14, 15, and 16. Brackets 122, 123, can be made an extended length with teardrop slots 128 located at appropriate positions on front facing flanges 130 so as to enable two, three, four, or more displays to be mounted in a vertical array. Also, multiple mounts 120 can be connected vertically with brackets 190 secured with fasteners 192 as depicted in FIGS. 20A and 20B.

Figure 19:
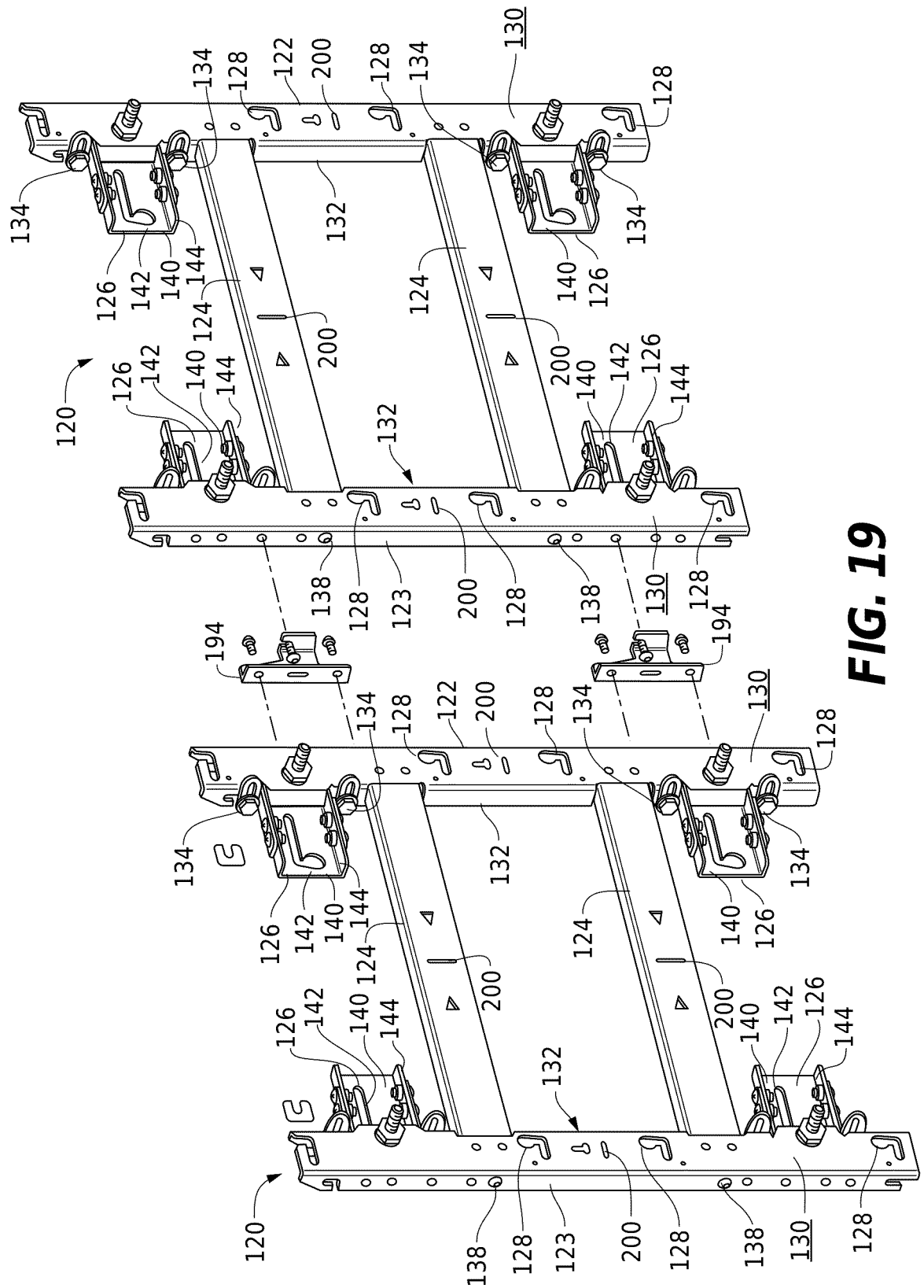
FIG. 19 is an exploded isometric view of horizontal attachment of the mounts of FIG. 12.

In addition, mounts 20 can be linked horizontally with brackets 194 as depicted in FIG. 19. As such, a virtually unlimited variety of overall array shapes of electronic displays can be achieved, with non-limiting exemplary embodiments depicted in FIGS. 17A, 17B, 18A, 18B, 23A, 23B, 24A, and 24B.

In embodiments, slots 200 can be provided in brackets 122, 123, and/or cross-braces 124 to receive the perpendicular end 202 of a common tape measure 204, as depicted in FIGS. 22A-22D. Slots 200 can be located at the approximate mid-point of attached electronic displays 62 to enable easy measurement relative to a floor, ceiling, or adjacent walls of a structure and thereby enable precise positioning of the electronic displays.

As depicted in FIGS. 27A and 27B, side panels 206 can be attached to system 120 with brackets 208 to provide for a finished appearance to the installation.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above.

The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from: different individual embodiments, as understood by persons of ordinary skill in the art. Moreover, elements described with respect to one embodiment can: be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims, Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, if is expressly intended that the provisions of 35 U.S.C. § 112(f) are not to be invoked unless the specific terms "means for" or "step for" are recited in a claim.

What is claimed is:

1. A modular system for mounting multiple electronic display devices to a wall of a structure in an array having multiple rows and columns, the system comprising:
    a first mount comprising:
        a first pair of spaced-apart brackets, each bracket presenting a front flange defining a plurality of slots, each slot adapted to receive a fastener coupled to an electronic display so as to attach the electronic display to the bracket; and
        a first plurality of mounting feet operably coupled to a first one of the first pair of spaced-apart brackets, and a second plurality of mounting feet operably coupled to a second one of the first pair of spaced apart brackets, each of the mounting feet in the first and second pluralities of mounting feet adapted to attach to the wall and defining a slot enabling the mounting foot to shift parallel to a plane of the wall, each one of the first plurality of mounting feet being separately selectively shiftable relative to the first one of the spaced-apart brackets and each one of the second plurality of mounting feet being separately selectively shiftable relative to the second one of the spaced-apart brackets so as to enable the respective bracket to be selectively adjusted for position in a direction perpendicular to the wall;
        the first mount adapted to receive a first plurality of the electronic display devices to form a column of a vertically oriented array; and
    a second mount comprising:
        a second pair of spaced-apart brackets, each bracket presenting a front flange defining a plurality of slots, each slot adapted to receive a fastener coupled to an electronic display so as to attach the electronic display to the bracket; and
        a third plurality of mounting feet operably coupled to a first one of the second pair of spaced-apart brackets, and a fourth plurality of mounting feet operably coupled to a second one of the second pair of spaced apart brackets, each of the mounting feet in the third and fourth pluralities of mounting feet adapted to attach to the wall and defining a slot enabling the mounting foot to shift parallel to a plane of the wall, each one of the third plurality of mounting feet being separately selectively shiftable relative to the first one of the spaced-apart brackets and each one of the fourth plurality of mounting feet being separately selectively shiftable relative to the second one of the spaced-apart brackets so as to enable the respective bracket to be selectively adjusted for position in a direction perpendicular to the wall;
        the second mount adapted to receive at least one of the electronic display devices, the second mount operably coupled to the first mount so that the first plurality of the electronic display devices and the at least one of the electronic display devices form a row of a horizontally oriented array.

2. The system of claim 1, wherein each mounting foot of the first, second, third, and fourth pluralities of mounting feet is shiftable relative to the respective spaced-apart bracket to which the mounting foot is coupled with an adjustment screw assembly.

3. The system of claim 1, wherein the slot defined in each mounting foot is teardrop shaped.

4. The system of claim 1, wherein the slots defined in each one of the spaced-apart brackets are teardrop shaped.

5. The system of claim 1 wherein the first pair of spaced-apart brackets receives two, three, or four electronic displays.

6. The system of claim 5 wherein each of the electronic displays is coupled with a plurality of fastening buttons.

7. The system of claim 1, further comprising a pair of side panels, each side panel operably coupled to a separate one of the mounts.

8. The system of claim 1, wherein each one of the first pair of spaced-apart brackets is selectively adjustable in a length dimension to accommodate fewer or more electronic displays.

9. The system of claim 1, wherein each one of the second pair of spaced-apart brackets is selectively adjustable in a length dimension to accommodate fewer or more electronic displays.

10. An array of a plurality of separate electronic displays mountable to a wall of a structure comprising:
at least a first one of the plurality electronic displays coupled to a first mount adapted to attach to the wall, the first mount comprising:
a first pair of spaced-apart brackets, each bracket presenting a front flange defining a plurality of slots, each slot receiving a fastener coupled to the electronic display so as to attach the electronic display to the bracket; and
a first plurality of mounting feet operably coupled to a first one of the first pair of spaced-apart brackets, and a second plurality of mounting feet operably coupled to a second one of the first pair of spaced apart brackets, each of the mounting feet in the first and second pluralities of mounting feet adapted to attach to the wall and defining a slot enabling the mounting foot to shift parallel to a plane of the wall, each one of the first plurality of mounting feet being separately selectively shiftable relative to the first one of the spaced-apart brackets and each one of the second plurality of mounting feet being separately selectively shiftable relative to the second one of the spaced-apart brackets so as to enable the respective bracket to be selectively adjusted for position in a direction perpendicular to the wall; and
at least a second one of the plurality of electronic displays coupled to a second mount adapted to attach to the wall, the second mount operably coupled to the first mount.

11. The array of claim 10, wherein the second mount comprises:
a second pair of spaced-apart brackets, each bracket presenting a front flange defining a plurality of slots, each slot adapted to receive a fastener coupled to an electronic display so as to attach the electronic display to the bracket; and
a third plurality of mounting feet operably coupled to a first one of the second pair of spaced-apart brackets, and a fourth plurality of mounting feet operably coupled to a second one of the second pair of spaced apart brackets, each of the mounting feet in the third and fourth pluralities of mounting feet adapted to attach to the wall and defining a slot enabling the mounting foot to shift parallel to a plane of the wall, each one of the third plurality of mounting feet being separately selectively shiftable relative to the first one of the spaced-apart brackets and each one of the fourth plurality of mounting feet being separately selectively shiftable relative to the second one of the spaced-apart brackets so as to enable the respective bracket to be selectively adjusted for position in a direction perpendicular to the wall.

12. The array of claim 11, wherein each one of the second pair of spaced-apart brackets is selectively adjustable in a length dimension to accommodate fewer or more electronic displays.

13. The array of claim 10, wherein each one of the first pair of spaced-apart brackets is selectively adjustable in a length dimension to accommodate fewer or more electronic displays.

14. A mount for attaching multiple electronic display devices to a wall of a structure, the mount comprising:
a first pair of spaced-apart brackets, each bracket presenting a front flange defining a plurality of slots, each slot adapted to receive a fastener coupled to an electronic display so as to attach the electronic display to the bracket, each bracket being selectively adjustable in a length dimension;
a plurality of cross braces extending between the spaced-apart brackets; and
a first plurality of mounting feet operably coupled to a first one of the first pair of spaced-apart brackets, and a second plurality of mounting feet operably coupled to a second one of the first pair of spaced apart brackets, each of the mounting feet in the first and second pluralities of mounting feet adapted to attach to the wall and defining a slot enabling the mounting foot to shift parallel to a plane of the wall, each one of the first plurality of mounting feet being separately selectively shiftable relative to the first one of the spaced-apart brackets and each one of the second plurality of mounting feet being separately selectively shiftable relative to the second one of the spaced-apart brackets so as to enable the respective bracket to be selectively adjusted for position in a direction perpendicular to the wall.

15. The mount of claim 14, wherein each mounting foot of the first and second plurality pluralities of mounting feet is shiftable relative to the respective spaced-apart bracket to which the mounting foot is coupled with an adjustment screw assembly.

16. The mount of claim 14, further comprising a second pair of spaced-apart brackets, each of the second pair of brackets presenting a front flange defining a plurality of slots, each slot adapted to receive a fastener coupled to an electronic display so as to attach the electronic display to the second pair of spaced-apart brackets, each of the second pair of brackets being selectively adjustable in a length dimension, a third plurality of mounting feet operably coupled to a first one of the second pair of spaced-apart brackets, and a fourth plurality of mounting feet operably coupled to a second one of the second pair of spaced apart brackets, each of the mounting feet in the third and fourth pluralities of mounting feet adapted to attach to the wall and defining a slot enabling the mounting foot to shift parallel to the plane of the wall, each one of the third plurality of mounting feet being separately selectively shiftable relative to the first one of the second pair of spaced-apart brackets and each one of the fourth plurality of mounting feet being separately selectively shiftable relative to the second one of the second pair of spaced-apart brackets so as to enable the respective bracket to be selectively adjusted for position in a direction perpendicular to the wall, the second pair of spaced-apart brackets operably coupled to the first pair of spaced-apart brackets in a horizontally or vertically adjacent relation.

17. The mount of claim 14, wherein the first pair of spaced-apart brackets receives one, two, three, or four electronic displays.

18. The mount of claim 17, wherein each of the electronic displays is coupled with a plurality of fastening buttons.

\* \* \* \* \*